US012804645B2

(12) United States Patent
Li et al.

(10) Patent No.: US 12,804,645 B2
(45) Date of Patent: Nov. 17, 2026

(54) REPORTING UE CAPABILITY ON CROSS FREQUENCY/BAND SRS INDICATION

(71) Applicant: QUALCOMM Incorporated, San Diego, CA (US)

(72) Inventors: Qiaoyu Li, Beijing (CN); Yan Zhou, San Diego, CA (US); Tao Luo, San Diego, CA (US); Mahmoud Taherzadeh Boroujeni, San Diego, CA (US); Wooseok Nam, San Diego, CA (US); Junyi Li, Greentown, PA (US); Jelena Damnjanovic, Del Mar, CA (US); Fang Yuan, Beijing (CN); Arumugam Chendamarai Kannan, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 18/837,868

(22) PCT Filed: Apr. 18, 2022

(86) PCT No.: PCT/CN2022/087330

§ 371 (c)(1),
(2) Date: Aug. 12, 2024

(87) PCT Pub. No.: WO2023/201457

PCT Pub. Date: Oct. 26, 2023

(65) Prior Publication Data

US 2025/0151053 A1 May 8, 2025

(51) Int. Cl.
*H04W 72/1268* (2023.01)
*H04B 7/0456* (2017.01)
(Continued)

(52) U.S. Cl.
CPC ...... *H04W 72/1268* (2013.01); *H04B 7/0456* (2013.01); *H04B 7/0617* (2013.01); *H04L 5/0098* (2013.01)

(58) Field of Classification Search
CPC ... H04W 72/1268; H04W 8/24; H04W 72/21; H04B 7/0456; H04B 7/0617; H04L 5/0098; H04L 5/0053; H04L 5/0094
See application file for complete search history.

(56) References Cited

U.S. PATENT DOCUMENTS

| | | | |
|---|---|---|---|
| 10,492,150 | B2 | 11/2019 | Hessler et al. |
| 2021/0144716 | A1 | 5/2021 | Choi et al. |

(Continued)

FOREIGN PATENT DOCUMENTS

| | | | |
|---|---|---|---|
| CN | 108496396 | A | 9/2018 |
| WO | 2021081869 | A1 | 5/2021 |

(Continued)

OTHER PUBLICATIONS

Supplementary European Search Report—EP22937698—Search Authority—The Hague—Dec. 18, 2025.

(Continued)

*Primary Examiner* — Yu-Wen Chang
(74) *Attorney, Agent, or Firm* — Procopio, Cory, Hargreaves & Savitch

(57) ABSTRACT

A user equipment (UE) may be configured to transmit an indication of UE capability to support a cross frequency range/band sounding reference signal (SRS) indication for physical uplink shared channel (PUSCH) scheduling. The UE may transmit the indication of the UE capability to the network node, the indication of the UE capability including an association between a first reference signal (RS) transmitted in a first frequency band and a second frequency band, the second frequency band being different from the (Continued)

first frequency band, transmit the first RS in the first frequency band to the network node, and receive an uplink (UL) grant scheduling a UL channel associated with the second frequency band from the network node, the UL grant being based at least in part on the first RS in the first frequency band.

30 Claims, 14 Drawing Sheets

(51) Int. Cl.
*H04B 7/06* (2006.01)
*H04L 5/00* (2006.01)

(56) References Cited

U.S. PATENT DOCUMENTS

2022/0060307 A1* 2/2022 Manolakos ........... H04L 5/0048
2022/0346091 A1* 10/2022 Karmoose ............. H04L 1/0041
2023/0208607 A1* 6/2023 Lim .......................... H04L 5/16 370/280
2023/0276453 A1* 8/2023 Hu ........................ H04L 5/0044 370/329
2023/0291611 A1* 9/2023 Zeng ..................... H04W 52/54
2024/0057071 A1* 2/2024 Sun ................... H04W 72/1268
2024/0129822 A1* 4/2024 Huang .................. H04W 36/08
2024/0405827 A1* 12/2024 Cui ...................... H04B 17/328

FOREIGN PATENT DOCUMENTS

WO 2021149016 A1 7/2021
WO 2022039854 A1 2/2022

OTHER PUBLICATIONS

International Search Report and Written Opinion—PCT/CN2022/087330—ISA/CN—Nov. 28, 2022.

Qualcomm Incorporated., et al., "FR1/FR2 Differentiation for Enhanced UL Grant Skipping Capabilities", 3GPP TSG-RAN WG2 Meeting #115-e, R2-2108651, Electronic, Aug. 9, 2021-Aug. 27, 2021, 56 Pages.

* cited by examiner

REPORTING UE CAPABILITY ON CROSS FREQUENCY/BAND SRS INDICATION

CROSS REFERENCE TO RELATED APPLICATIONS

This application is a National Stage Application filed under 35 U.S.C. § 371 of PCT International Application Serial No. PCT/CN2022/087330 entitled "REPORTING UE CAPABILITY ON CROSS FREQUENCY/BAND SRS INDICATION" and filed on Apr. 18, 2022, which is expressly incorporated by reference herein in its entirety.

TECHNICAL FIELD

The present disclosure relates generally to communication systems, and more particularly, to a method of reporting a user equipment (UE) capabilities on cross frequency/band sounding reference signal (SRS) indication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE) and a network node. The UE may be configured to transmit an indication of UE capability to support a cross frequency range/band sounding reference signal (SRS) indication for PUSCH scheduling. The UE may transmit the indication of the UE capability to the network node, the indication of the UE capability including an association between a first reference signal (RS) resource set in a first frequency band and a second frequency band, transmit the first RS resource set in the first frequency band to the network node; and receive an uplink (UL) grant scheduling a UL channel associated with the second frequency band from the network node, the UL grant being based at least in part on the first RS resource set in the first frequency band. The network node may receive the indication of the UE capability, receive the first RS resource set in the first frequency band from the UE, and transmit the UL grant scheduling the UL channel associated with the second frequency band for the UE, the UL grant being based at least in part on the first RS resource set in the first frequency band.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
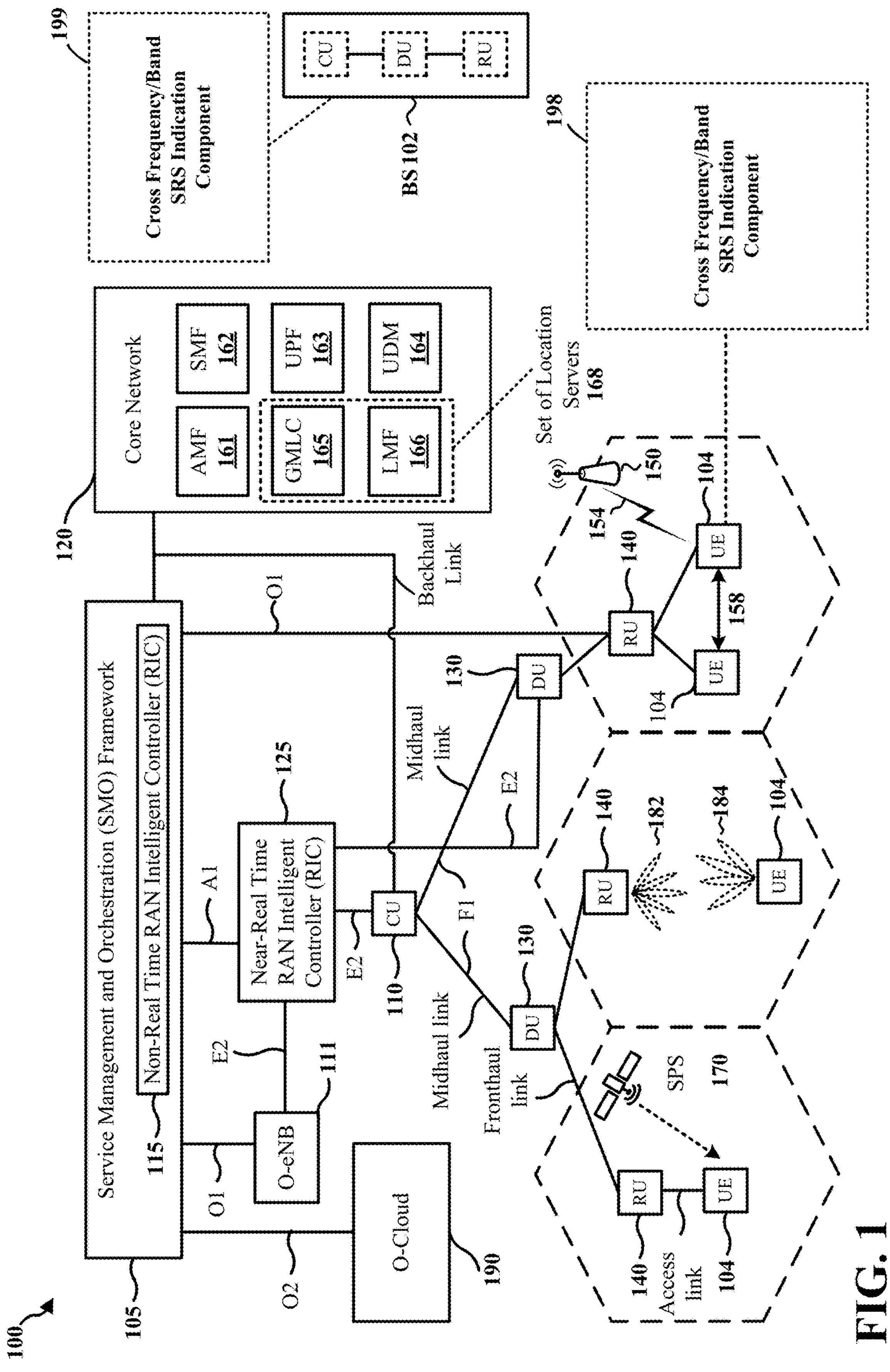
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be include a cross frequency/band SRS indication component 198 configured to transmit an indication of a UE capability to a network node, the indication of the UE capability including an association between a first RS resource set in a first frequency band and a second frequency band, transmit the first RS resource set in the first frequency band to the network node; and receive a UL grant scheduling a UL channel associated with the second frequency band from the network node, the UL grant being based at least in part on the first RS resource set in the first frequency band. In certain aspects, the base station 102 may include a cross frequency/band SRS indication component 199 configured to receive an indication of a UE capability from a UE, the indication of the UE capability including an association between a first RS resource set in a first frequency band and a second frequency band, receive the first RS resource set in the first frequency band from the UE, and transmit a UL grant scheduling a UL channel associated with the second frequency band for the UE, the UL grant being based at least in part on the first RS resource set in the first frequency band.

Figures 2A, 2B, 2C, 2D:
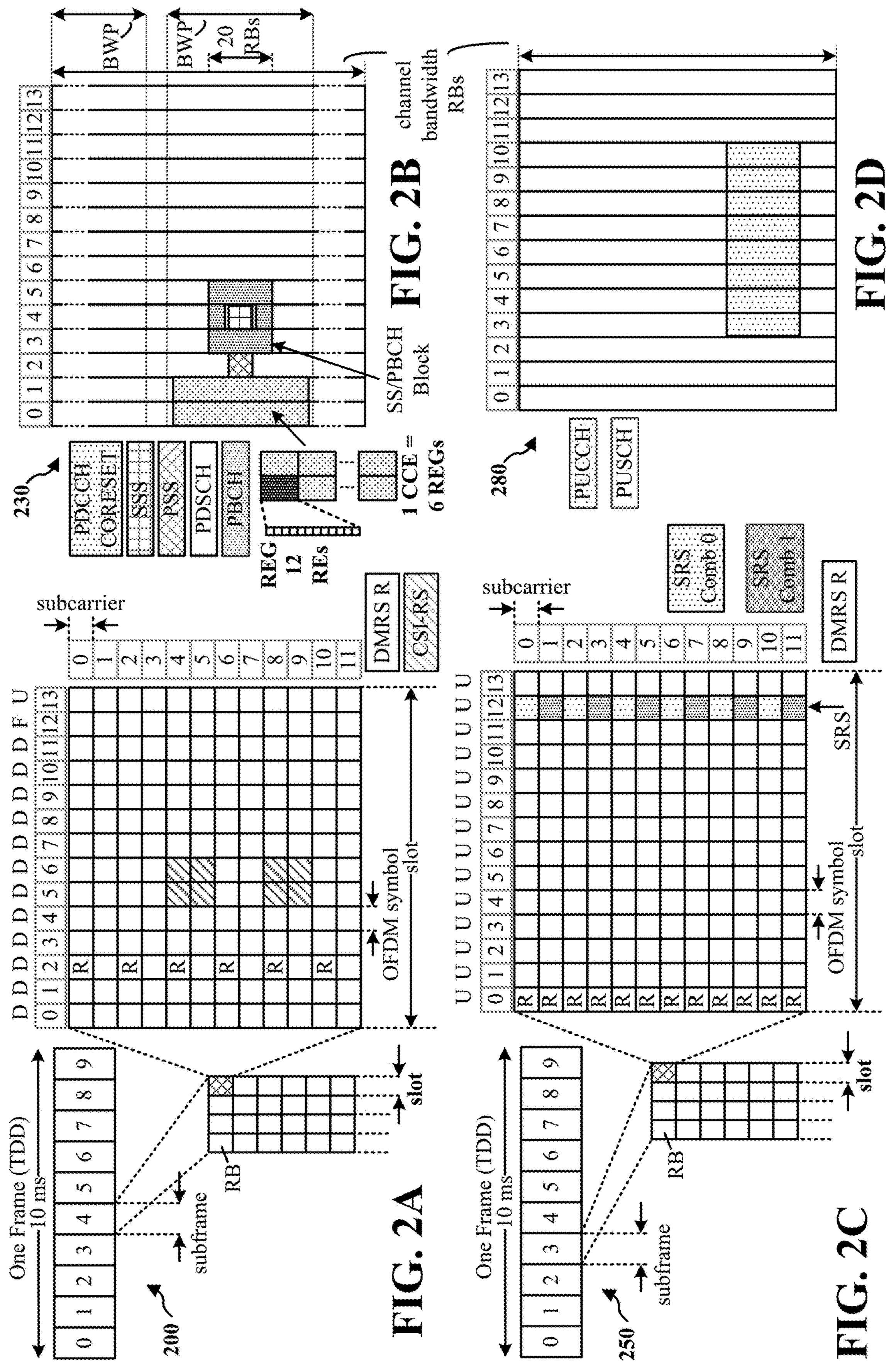
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
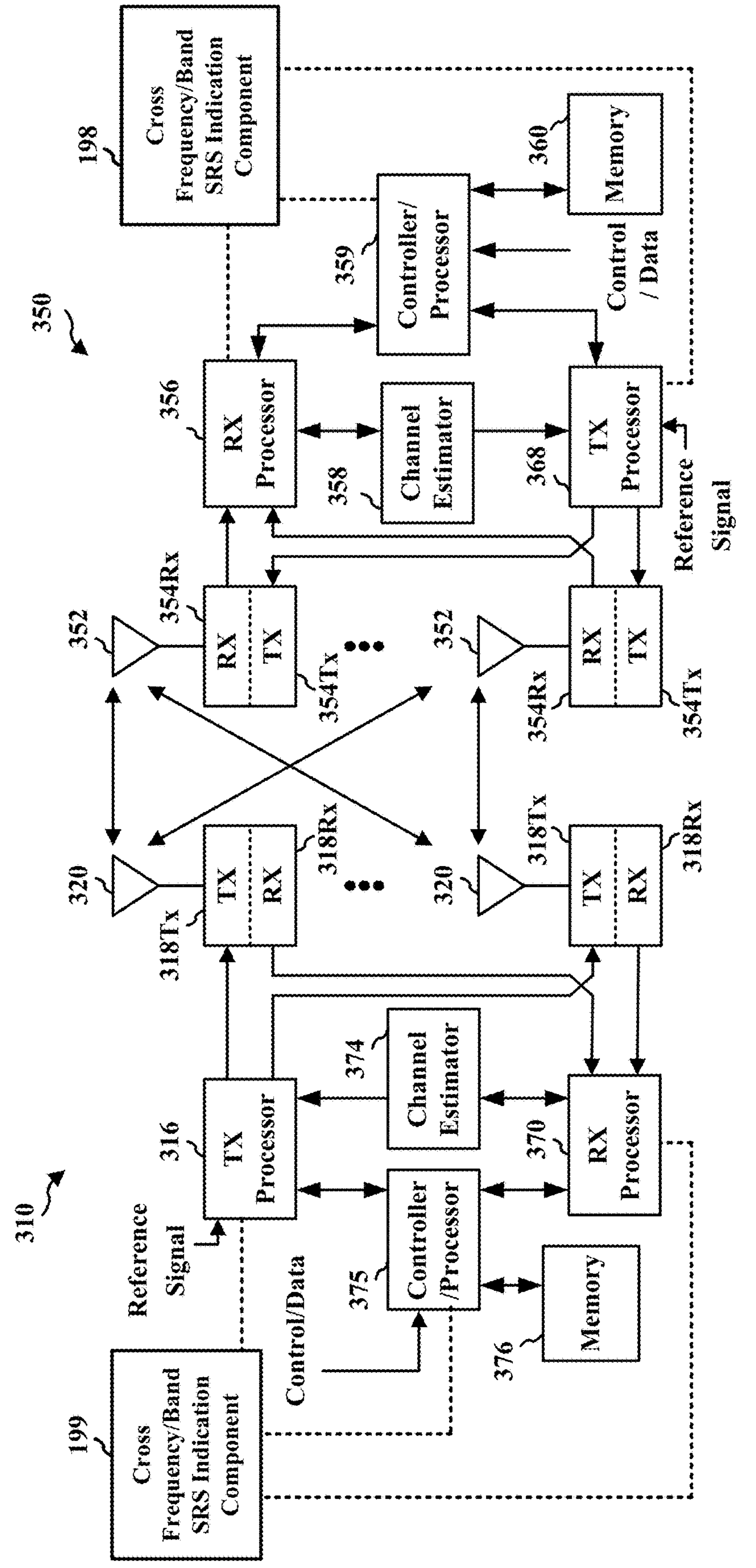
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the cross frequency/band SRS indication component 198 of FIG. 1. At least one of the TX processor 316, the RX processor 370, and the controller/processor 375 may be configured to perform aspects in connection with the cross frequency/band SRS indication component 199 of FIG. 1.

A UE trying to access a communication network may follow a cell search procedure that may include a series of synchronization stages. In some examples, the synchronization stages may enable the UE to determine time and/or frequency resources that may be useful for demodulating downlink signals, transmitting with the correct timing, and/or acquiring system information. Synchronization signal blocks (SSBs) may include a primary synchronization signal (PSS), a secondary synchronization signal (SSS), and a physical broadcast channel (PBCH). The UE may use the PSS to determine symbol timing and a physical layer identity. The UE may use the SSS to determine a physical layer cell identity group number (e.g., a "cell identifier") and radio frame timing. The PBCH may carry a master information block (MIB), which may provide a number of resource blocks in the system bandwidth and a system frame number.

The SSBs may be transmitted (e.g., transmitted by a base station) at predetermined locations (e.g., time locations) within an SSB period, and the maximum number of SSBs may depend on the frequency band. In some examples, each SSB may be transmitted on a different beam, and the UE may search for all of the SSBs until the UE identifies a suitable SSB (e.g., an SSB associated with a satisfactory measurement). In certain such examples, once the UE identifies a suitable SSB, the UE may read the PBCH and then acquire the SIB (e.g., SIB1), which may indicate how many SSBs are transmitted. For example, as mentioned above, the SSB may include a PSS, an SSS, and PBCH. The UE may obtain symbol timing from the PSS. The UE may then obtain the cell identifier from the SSS. The UE may then read the MIB that is encoded in the PBCH, which may include information used to read SIBs. The UE may then acquire the SIB1. After the UE is operating in a connected mode, the base station may indicate which SSBs are transmitted via a separate dedicated RRC configuration, which may be more detailed than (and may, thus, override) the indication in SIB1.

Figure 4A:
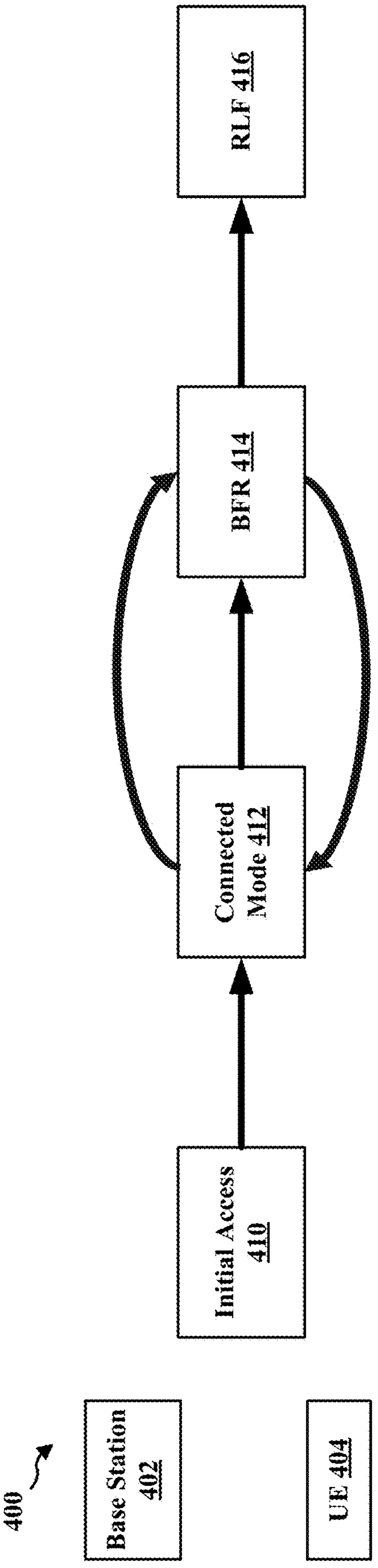
FIG. 4A illustrates an example flow diagram of a beam management procedure for a base station and a UE, in accordance with various aspects of the present disclosure.

In some examples, to perform beam management procedures, a UE may measure SSBs to facilitate performing a random access channel (RACH) procedure with a base station. FIG. 4A illustrates an example flow diagram 400 of a beam management procedure for a base station 402 and a UE 404, as presented herein. In the illustrated example of FIG. 4A, the UE 404 may perform an initial access procedure 410 to establish a connected mode state 412 with a communication network (e.g., the base station 402). For example, the initial access procedure 410 may include the base station 402 performing SSB beam sweeping in which the base station 402 may transmit SSBs in different directions and/or angles to facilitate analog beam forming. As used herein, the terms "SSB" and "beams" may be used interchangeably, except when indicated. The UE 404 may receive one or more SSBs, perform measurements on the received SSBs, and select a strongest SSB based on the measurements. The SSBs may be associated with wide beams (e.g., layer 1 (L1) beams). The UE 404 may then perform the RACH procedure with the base station 402 based on the selected SSB. For example, the UE 404 may transmit a preamble corresponding to the selected SSB.

Figure 4B:
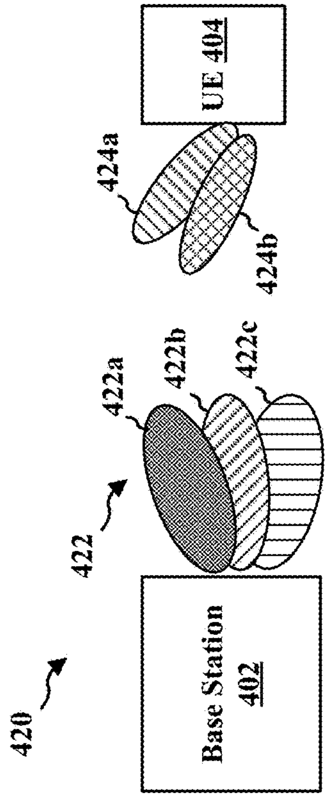
FIG. 4B illustrates an example of SSB beam sweeping between the base station and the UE, in accordance with various aspects of the present disclosure.

FIG. 4B illustrates an example of SSB beam sweeping 420 between the base station 402 and the UE 404, as presented herein. In the example of FIG. 4B, the base station 402 transmits an SSB burst set 422 including a first beam 422*a*, a second beam 422*b*, and a third beam 422*c*. The UE 404 may perform measurements on the received beams and indicate a strongest beam. As shown in FIG. 4B, the UE 404 receives a first beam 424*a* and a second beam 424*b*. In some examples, based on the indicated strongest beam, the base station 402 and the UE 404 may establish a beam pair link. For example, to facilitate downlink communication from the base station 402 to the UE 404, the base station 402 may transmit the downlink communication using the second beam 422*b* and the UE 404 may receive the downlink communication using the first beam 424*a*. In such examples, the selected beam pair (e.g., the second beam 422*b* and the first beam 424*a*) may be referred to as a beam pair link.

However, in such scenarios, the UE 404 may perform measurements on multiple SSBs before selecting the strongest beam, which may also increase latency as the quantity of SSBs may be large. To improve performance of the beam management procedure, in some examples, the UE 404 may be configured to measure a reduced quantity of SSBs (e.g., a subset of the SSBs). For example, the base station 402 may transmit sixteen beams, but the UE 404 may measure four of the beams.

After the initial access procedure 410 is complete, the UE 404 may operate in the connected mode state 412. While operating in the connected mode state 412, the base station 402 and the UE 404 may perform beam refinement procedures. In some examples, such procedures may be referred to as "sunny day operations." In some examples, the beam refinement procedures may include hierarchical beam refinement. In some examples, the beam refinement procedures may include U1, U2, U3 procedures. The base station 402 and the UE 404 may transmit layer 1 reports to facilitate the beam refinement.

Figure 4C:
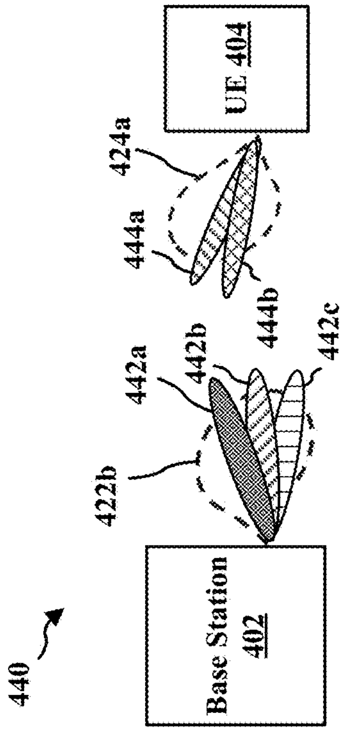
FIG. 4C illustrates an example of beam refinement between the base station and the UE, in accordance with various aspects of the present disclosure.

FIG. 4C illustrates an example of beam refinement 440 between the base station 402 and the UE 404, as presented herein. In the example of FIG. 4C, the base station 402 and the UE 404 perform a CSI-RS beam sweep. For example, the base station 402 may transmit a first CSI-RS 442*a*, a second CSI-RS 442*b*, and a third CSI-RS 442*c*. As shown in FIG. 4C, the first CSI-RS 442*a*, the second CSI-RS 442*b*, and the third CSI-RS 442*c* are narrower beams within the second beam 422*b* selected at the base station 402 for the beam pair link. The UE 404 may perform measurements on CSI-RS received at narrower beams within the first beam 424*a* selected at the UE 404 for the beam pair link. For example, the UE 404 may perform measurements on a first beam 444*a* and a second beam 444*b* that are narrower beams than the first beam 424*a*. The base station 402 and the UE 404 may then select another beam pair link based on the narrower beams. It may be appreciated that the base station 402 and the UE 404 may communicate using the wider beams, as shown in FIG. 4B, and/or using the narrower beams, as shown in FIG. 4C.

Returning to the flow diagram of FIG. 4A, while operating in the connected mode state 412, the base station 402 and the UE 404 may experience a beam failure. For example, a selected beam of the beam pair link may become blocked. In such examples, the base station 402 and the UE 404 may perform a beam failure recovery (BFR) procedure. For example, the base station 402 and the UE 404 may perform a BFR procedure 414 to facilitate a fast recovery from the beam failure.

In some examples, when the BFR procedure 414 is successful, the UE 404 returns to operating in the connected mode state 412. However, in some examples, the BFR procedure 414 may be unsuccessful. For example, the base station 402 and the UE 404 may experience radio link failure (RLF). In such examples, the base station 402 and the UE 404 may perform an RLF procedure 416 to attempt to reestablish a radio link. In some examples, the RLF procedure 416 may be a last resort for the base station 402 and the UE 404 in attempting to maintain a connection.

As described above, a beamforming technology (e.g., 5G NR mmW technology) may use beam management procedures, such as beam measurements and beam switches, to maintain a quality of a link between a first device and a second device (e.g., an access link between a base station and a UE or a sidelink communication link between a first UE and a second UE) at a sufficient level. Beam management procedures aim to support mobility and the selection of the best beam pairing (or beam pair link (BPL)) between the first device and the second device. Beam selection may be based on a number of considerations including logical state, power saving, robustness, mobility, throughput, etc. For example, wide beams (e.g., the example beams of FIG. 4B) may be used for initial connection and for coverage/mobility, while narrow beams (e.g., the example beams of FIG. 4C) may be used for high throughput scenarios with low mobility.

The AI/ML models may be implemented for air-interface to improve performance or reduce complexity or potential impact to specification. For example, the use case may include CSI, beam management, or positioning. The implementation may be evaluated based on various methodology and key performance indicators (KPIs). In one example, the AI/ML model implementations may be evaluated based on the current non-ML solutions, with complexity and overhead aspects taken into account. Evaluation methodology may be based on an existing methodology, with consideration of a potential extension, modification, or improvement from the existing methodology. Also, the evaluation of the AI/ML models may be based on use-case-specific KPIs. For example, various degrees of collaboration may be provided between participating nodes (e.g., the access link between a base station and a UE or the sidelink communication link between a first UE and a second UE), particularly in terms identifying the aspects for implementation, and the aspects with specification impact.

In some aspects, a cross frequency range/band SRI/TPMI indication and PUSCH scheduling may be configured for a first device and a second device. That is, the first device and the second device of the network may communicate using a first frequency band and a second frequency band, and the first device and the second device may use a first reference signal (RS) in the first frequency band to schedule the wireless communication in the second frequency band. Here, the RS may include a sounding RS (SRS). The first device may be a network node (e.g., gNB or base station) and the second device may be a UE. The UE may transmit the first RS in the first frequency band, and the network node and the UE may predict a precoding of a physical uplink shared channel (PUSCH) in the second frequency band and schedule a physical uplink shared channel (PUSCH) in the second frequency band based on the first RS in the first frequency band.

The second frequency band may be a higher frequency band than the first frequency band. In one aspect, the first frequency band and the second frequency band may refer to a first frequency range designation and a second frequency range designation. For example, the first frequency band may refer to FR1 and the second frequency band may refer to FR2. In another aspect, the first frequency band and the second frequency band may refer to a first frequency band and a second frequency band within a frequency range designation. For example, the first frequency band may refer to 28 GHz and the second frequency band may refer to 47 GHz.

In some aspect, the first frequency band may be FR1 and the second frequency band may be FR2. By using the first RS in FR1 to predict the PUSCH precoding and schedule the PUSCH in FR2, the first RS may have a better coverage since FR1 may have a better sounding coverage than FR2 which is the higher frequency band than FR1. Also, using the first RS in FR1 to the PUSCH precoding and schedule the PUSCH in FR2, the UE may have less power consumption on the second device's part (e.g., the UE), since the UE may potentially perform less beam sweeping through FR1 and less transmission power due to the better coverage.

In one aspect, the first device and the second device may be configured to bypass using the RS (e.g., SRS) in FR2 and use the RS in FR1. The second device (e.g., UE) may transmit first RS in FR1. In one example, the second device may receive a downlink (DL) RS (DL-RS) in FR1 or in FR2. The second device may include an AI/ML model to predict FR2 channel (PUSCH) based on the DL-RS in FR1 or in FR2. The first device may indicate an SRS resource indicator and/or a transmit precoder matrix indicator (SRI/TPMI) associated with the first RS in FR1, when scheduling PUSCH in FR2. The first device may also indicate additional information for FR1 and/or FR2 (e.g., AoA/AoD) estimated from the first RS in FR1, which may help the UE to determine its transmit beamforming (Tx-BF) in FR2. In another example, the second device (e.g., UE) may include an AI/ML model to predict the Tx-BF in FR2, based on the base station indications associated with FR1 and the predicted FR2 channel characteristics.

In another aspect, the first device and the second device may be configured to use occasional RS transmission in FR2. The second device (e.g., UE) may be configured to transmit the first RS in FR1 more frequently and the second RS in FR2 occasionally. That is, the first RS transmission in FR1 may have a higher periodicity than the second RS transmission in FR2, and the first RS in FR1 may be more frequently transmitted than the second RS in FR2. In one example, the first device may include an AI/ML model configured to predict the Tx-BF at the UE in FR2 based on the first RS and the second RS received in FR1/FR2, and indicate SRI/TPMI of FR2 via a UL-grant. In another example, the second device may receive the DL-RS in FR1 or in FR2 and include an AI/ML model to predict FR2 channel (PUSCH) based on the DL-RS in FR1 or in FR2. In another example, the first device may include an AI/ML model identify a number of SRIs/TPMIs of FR2 based on the first RS and the second RS received in FR1/FR2. The first device may indicate a single set of SRI/TPMI based on the first RS and the second RS in FR1/FR2 in a scheduling the PUSCH in FR2, which may help the UE to determine its transmit beamforming (Tx-BF) in FR2. In another example, the second device (e.g., UE) may include an AI/ML model to predict the Tx-BF in FR2, based on the base station indications associated with FR1 and the predicted FR2 channel characteristics.

In some aspects, different antennas or antenna elements may be configured for the first frequency band and the second frequency band. Here, the antenna elements may refer to a unit antenna embodiment for reception or transmission of a signal. The antenna may include multiple antenna elements at a certain pattern. That is, in an inter-frequency range (FR) setup, the UE may include a first set of antennas for a first frequency range (e.g., sub-6 GHz) and a second set of antennas for a second frequency range (e.g., mmWave). In an intra-FR cross-band setup, the UE may include a first set of antenna elements for a first frequency band (e.g., 28 GHz) and a second set of antenna elements for a second frequency band (e.g., 47 GHz). Here, the first set of antennas and the second set of antennas may have different numbers, locations, orientations, and/or beamforming patterns, etc., and the first set of antenna elements and the second antenna elements may have a certain pattern that may show different wireless communication characteristics. Accordingly, the cross frequency range/band SRI/TPMI indication and PUSCH scheduling in inter-FR or intro-FR inter-band setup may be provided in certain scenarios.

Figure 5:
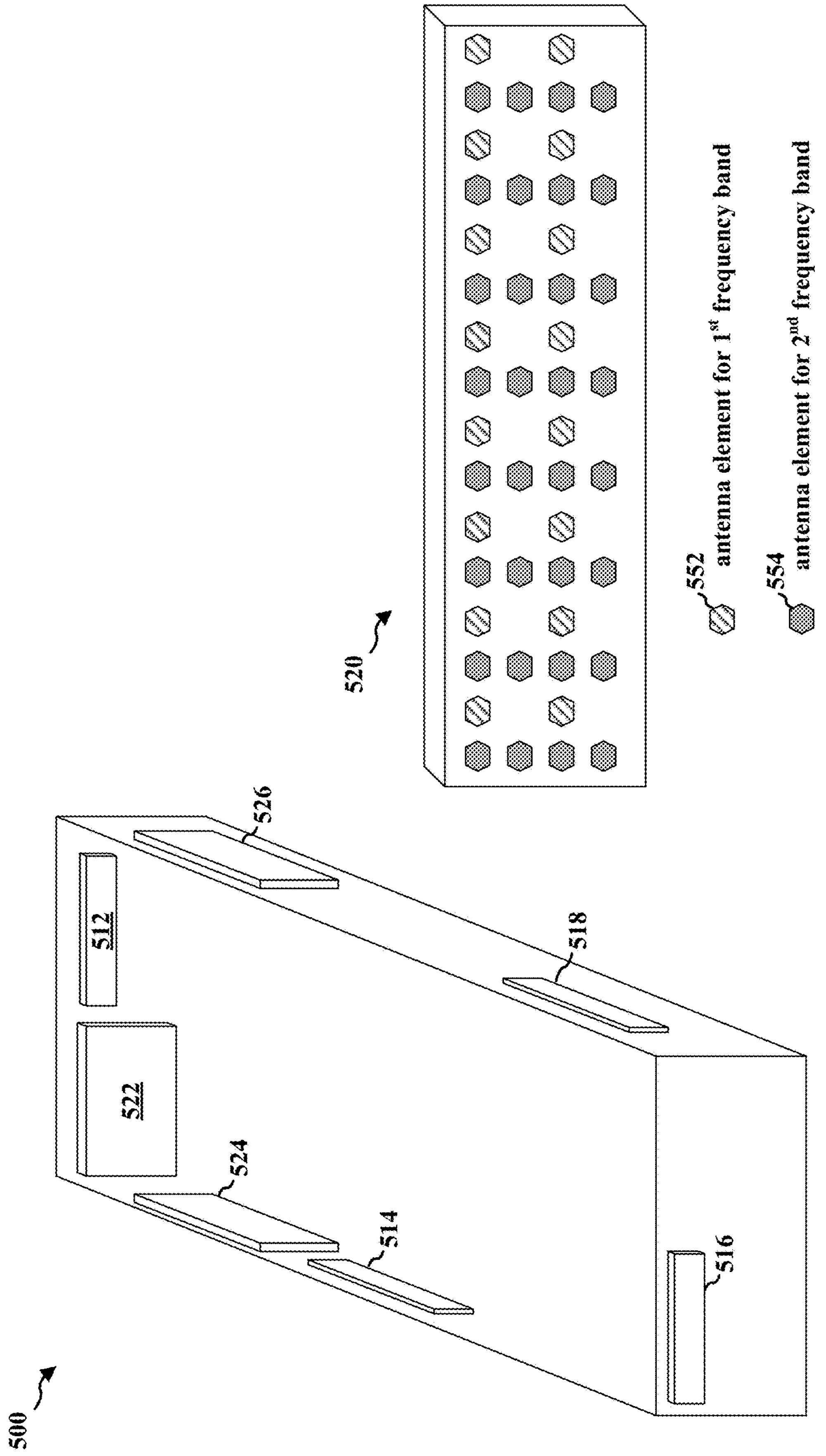
FIG. 5 illustrates an example of UE including multiple antennas.

FIG. 5 illustrates an example of UE 500 including multiple antennas. The UE 500 may include a first set of antenna elements 512, 514, 516, and 518 and a second set of antennas 522, 524, and 526. The antenna panel 520 shows a first set of antenna elements 552 associated with a first frequency band and a second set of antenna elements 554 associated with a second frequency band. Here, the first set of antenna elements 512, 514, 516 and 518 may be associated with FR1, and the second set of antennas 522, 524, and 526 may be associated with FR2. The first frequency band (e.g., 28 GHz) associated with the first set of antenna elements 552 may be a lower frequency band than the second frequency band (e.g., 47 GHz) associated with the second set of antenna elements 554.

In one aspect, to provide the cross frequency range/band the SRI/TPMI indication and PUSCH scheduling for the inter-FR setup, the first set of antenna elements 512, 514, 516 and 518 and the second set of antennas 522, 524, and 526 may be configured to have certain physical correlations. That is, some antenna elements for sub-6 GHz may be located closer to the mmW antenna panels, while some antenna elements for the sub-6 GHz may be located further from the mmWave antenna panels, and it may be reasonable to consider the ones that are closer to mmWave antenna panels to carry out such cross-FR/band SRI/TPMI indication and PUSCH scheduling. For example, the antenna element 512 of the first set of antennas and the antenna 522 of the second set of antennas may be located close to each other with similar orientations. Therefore, the first RS transmitted using the antenna element 512 in FR1 may be used by the base station and the UE to perform the cross frequency range/band the SRI/TPMI indication and PUSCH scheduling in FR2 using the antenna 522. On the other hand, the antenna element 516 of the first set of antennas and the antenna 526 of the second set of antennas may be located relatively far from each other with significantly different orientations. Therefore, the first RS transmitted using the antenna element 516 in FR1 may be used by the base station and the UE to properly perform the cross frequency range/band the SRI/TPMI indication and PUSCH scheduling in FR2 using the antenna 526.

In another aspect, to provide the cross frequency range/band SRI/TPMI indication and PUSCH scheduling for the inter-FR setup, the first set of antenna elements 552 and the second set of antenna elements 554 may be configured to have certain physical correlations. For example, the first set of antenna elements 552 (e.g., antenna elements for 28 GHz transmission) and the second set of antenna elements 554 (e.g., antenna elements for 47 GHz transmission) may be interleaved within the same antenna panel, e.g., to reduce the size/weight of form factor. Since the coverage of the 28 GHz may be better than 47 GHz, while the both bands sharing quite similar beamforming patterns. Accordingly, the first set of antenna elements 552 and the second set of antenna elements 554 interleaved together may provide proper cross-FR/band SRI/TPMI indication and PUSCH scheduling. However, if the first set of antennas and the second set of antennas are patterned in a shape that may not share quite similar beam forming patterns, they may not provide proper cross-FR/band SRI/TPMI indication & PUSCH scheduling.

In some aspects, the UE may report or transmit an indication of a UE capability to the network node to signal the cross frequency range/band associations among the antenna panels or antenna elements. Here, the UE capability may refer to the UE's capability to support the cross frequency range/band SRS indication and PUSCH scheduling. That is, the UE may transmit the indication of the UE's capability that the UE may perform the cross frequency range/band SRI/TPMI indication and PUSCH scheduling in the first frequency band and the second frequency band using the RS transmitted in the first frequency band, and the association between the first frequency band transmitted in the first frequency band and the second frequency band. The UE may report the associations among different panels or antenna elements with respect to different FRs, or with respect to different bands within the same FR.

In one aspect, the UE may transmit the first RS in the first FR using the first set of antenna elements 512, 514, 516 and 518, and report the associations between the first set of antenna elements 512, 514, 516 and 518 and the second set of antennas 522, 524, and 526. For example, for different FRs, e.g., FR1 and FR2, the UE 500 may include 4 antennas associated with sub-6 GHz transmission, and 3 antennas associated with the mmWave transmission. The UE may report to the network node the information associated with the first set of antenna elements 512, 514, 516 and 518 and the second set of antennas 522, 524, and 526. The Information associate with the first set of antenna elements 512, 514, 516 and 518 and the second set of antennas 522, 524, and 526 may include, but not limited to, how far away a certain antenna for FR1 transmission is from a certain antenna panel for FR2 transmission, whether the first set of antennas and/or the second set of antennas are omni-directional for the respective FRs, or respective TX-BF angle spreads associated with the first set of antennas and the second set of antennas.

In another aspect, for different bands within the same FR, a single panel may be jointly used for 28 GHz and 47 GHz transmission, while 16 antenna elements 552 on the panel are used for 28 GHz transmission, and another 32 antenna elements 554 on the panel are used for 47 GHz transmission. The UE may report to the network node the information associated with the first set of antenna elements 552 and the second set of antenna elements 554. The information associated with the first set of antenna elements 552 and the second set of antenna elements 554 may include, but are not limited to, numbers of the first set of antenna elements 552 associated with the first band and the second set of antenna elements 554 associated with the second band, interleaving patterns of the first set of antenna elements 552 associated with the first band and the second set of antenna elements 554 associated with the second band within the antenna panel 520, coupling loss difference between the first set of antenna elements 552 associated with the first band and the second set of antenna elements 554 associated with the second band within the antenna panel 520. Here, the coupling loss may refer to any transmission/reception loss caused by the other set of antenna elements, e.g., a first coupling loss in the first set of antenna elements 552 caused by the second set of antenna elements 554 and a second coupling loss in the second set of antenna elements 554 caused by the first set of antenna elements 552.

In some aspects, the UE's capability that the UE may perform the cross frequency range/band SRI/TPMI indication and PUSCH scheduling in the first frequency band and the second frequency band using the RS transmitted in the first frequency band may include a report of the associate among different sets of RS resources with response to different frequency ranges/bands.

Figure 6A:
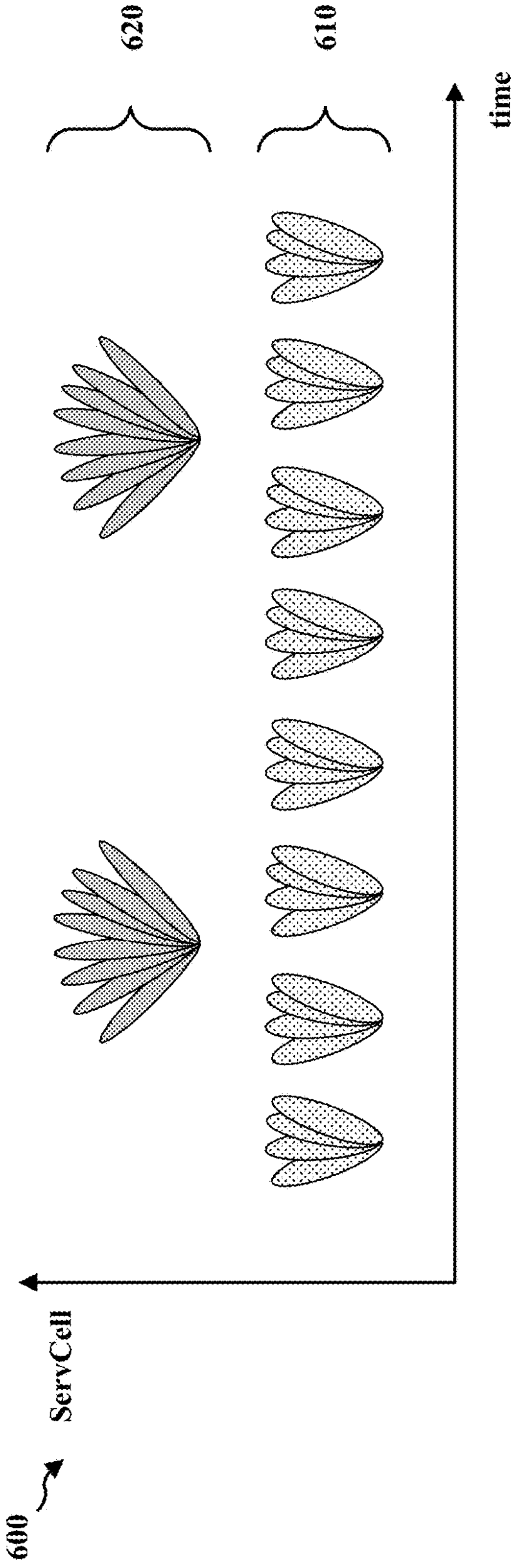
FIGS. 6A and 6B illustrate RS resource set transmitted by the second device to the first device.
Figure 6B:
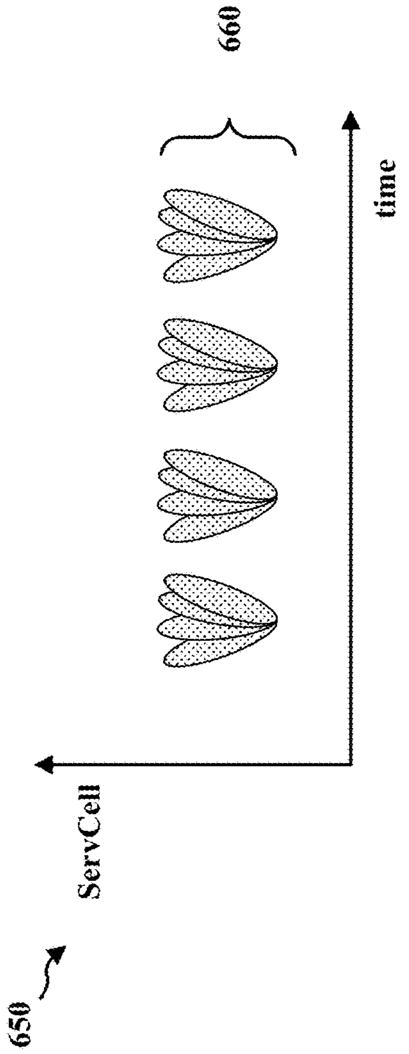

FIGS. 6A and 6B illustrate RS (e.g., SRS) resource set transmitted by the second device to the first device. FIG. 6A is a diagram 600 showing the two sets of RS resources 610 and 620, and the second device may be configured to transmit the first set of RS resources 610 in FR1 having a higher periodicity than the second set of RS resources 620 in FR2, and the first set of RS resources in FR1 may be more frequently transmitted than the second set of RS resources in FR2. Here, the first set of RS resources 610 may be associated with a first serving cell associated with the first frequency range/band and the second set of RS resources 620 may be associated with a second serving cell associated with the second frequency range/band.

The UE may report whether the UE supports transmitting the first set of RS resources more frequently while transmitting the second set of RS resources less frequently. Also, the UE may report whether the UE supports receiving the SRI/TPMI indication associated with the second set of RS resources 610 targeting a PUSCH scheduled within the second serving cell.

In one aspect, the UE may further report connections among a first subset of the RS resources within the $1^{st}$ RS resource set, and a $2^{nd}$ subset of the RS resources within the $2^{nd}$ RS resource set, indicating at least that the $1^{st}$ subset of RS resources within the $1^{st}$ RS resource set, may be used to simulate the $2^{nd}$ subset of the RS resources within the $2^{nd}$ Set of RS resources, which may be further based on reporting whether this is activated/deactivated by the UE.

In one example, UE may be configured with the $1^{st}$ set of RS resources including 4 RS resources (#1, #2, #3, and #4) within the $1^{st}$ serving cell in sub-6 GHz and the $2^{nd}$ set of RS resources including 2 RS resources (#1 and #2) within the $2^{nd}$ serving cell in 28 GHz (e.g., the UE may transmit the 2 sets of RS resources from 2 different antenna panels). The UE may further report that a pair of RS resources in the $1^{st}$ serving cell in sub-6 GHz is used to simulate the RS resources in the $2^{nd}$ serving cell in the 28 GHz. Here, the UE may use a first pair of RS resources (e.g., RS resources #1 and #2) within the $1^{st}$ set of RS resources to simulate the RS resource #1 in the $2^{nd}$ set of RS resources, and a second pair of RS resources (e.g., RS resources #3 and #4) within the $1^{st}$ set of RS resources to simulate the RS resource #2 in the $2^{nd}$ set of RS resources.

In another example, the UE may proactively report that using the first and/or the second pair of RS resources in the first $1^{st}$ serving cell to simulate the RS resources in the $2^{nd}$ serving cell is activated or deactivated.

In another example, the UE may further report an alternative simulating scheme where it uses all RS resources within the first set of RS resources (#1, #2, #3, and #4) to simulate one RS resource within the second set of RS resource (e.g., #1). The UE may further report whether it uses this alternative scheme or the original scheme of using a pair of RS resources in the first serving cell to simulate one RS resources in the second serving cell.

The reporting may be ordered by the network node via RRC signaling, a MAC-CE, and/or DCI, and the UE may report the UE capabilities of the cross frequency range/band SRI/TPMI indication and PUSCH scheduling via the RRC, the MAC-CE, or the UCI. The UE may be RRC configured with the $1^{st}$ set of RS resources within the $1^{st}$ serving cell and the $2^{nd}$ set of RS resources within the $2^{nd}$ serving cell.

In one example, the UE may proactively report the UE capability, without receiving a separate order to report from the network node, based on determining that the $2^{nd}$ RS resource set is associated with a dedicated RS-usage type (e.g., CrossFR-SRS type), while the $1^{st}$ serving cell and the $2^{nd}$ serving cell are linked with each other (e.g., through other gNB signaling). That is, reporting of the UE capability may be inherently instructed based on receiving a configuration of the $2^{nd}$ serving cell linked with the $1^{st}$ serving cell and the $2^{nd}$ RS resource set being associated with a dedicated RS usage type, and based on receiving the configuration of the $2^{nd}$ RS resource set being associated with a dedicated RS usage type for cross frequency range/band SRI/TPMI indication and PUSCH scheduling, the UE may report the UE capabilities to the network node.

In another example, a network node order may be further configured via RRC signaling within the $2^{nd}$ serving cell (e.g., indicating the $1^{st}$ serving cell ID, together with the IDs of the $1^{st}$ and $2^{nd}$ sets of RS resources), and the UE may report the UE capabilities for a single time via the RRC messaging.

In another example, the network node order may be further configured or activated via RRC signaling, a MAC-CE, or DCI (e.g., indicating the $1^{st}$ serving cell ID, together with the IDs of the $1^{st}$ and $2^{nd}$ sets of RS resources), and the UE may periodically or semi-persistently (P/SP) report the UE capabilities via the RRC signaling, the MAC-CE, or the DCI. For example, for a configured grant (CG) PUSCH configuration in the $2^{nd}$ serving cell, the UE may periodically or semi-persistently (P/SP) report the UE capabilities.

In another example, the network node order may be further indicated via the MAC-CE or the DCI associated with the $2^{nd}$ serving cell (e.g., indicating the $1^{st}$ serving cell ID, together with the IDs of the $1^{st}$ and $2^{nd}$ sets of RS resources), and the UE may report the UE capabilities a single time via the MAC-CE or the UCI.

FIG. 6B is a diagram 650 showing the first set of RS resources 660 in FR1. The UE may omit transmitting the set of RS resources in FR2. Here, the first set of RS resources 610 may be associated with a first serving cell associated with the first frequency range/band, and a PUSCH may be scheduled within a second serving cell associated with the second frequency range/band.

The UE may report whether it supports receiving the SRI/TPMI associated with the first set of RS resources as precoding information targeting the PUSCH scheduled within the second serving cell. That is, the UE may indicate that the UE has the capability to transmit the set of RS resources 660 in the first frequency range/band, and receive a UL grant scheduling the PUSCH within the second serving cell associated with the second frequency range/band, including the SRI/TPMI with regard to the first set of RS resources 660 of the first serving cell associated with the first frequency range/band. Here, the UL grant may be received via the DCI, e.g., DCI format 0. The UE may use an AI/ML model to predict the UL precoding for the PUSCH in the second serving cell associated with the second frequency range/band, and transmit the PUSCH in the second serving cell associated with the second frequency range/band based on the UL scheduling and the predicted UL precoding for the PUSCH.

In one aspect, the UE may further report connections among a $1^{st}$ subset of the RS resources within the $1^{st}$ set of RS resources, and a certain PUSCH layer scheduled within the $2^{nd}$ serving cell, such that the MCS for the PUSCH within the $2^{nd}$ serving cell may be indicated based on such UE reporting.

In one example, the UE may be configured with the $1^{st}$ set of RS resources including 4 RS resources (#1, #2, #3, and #4) within the $1^{st}$ serving cell in the sub-6 GHz, and may be scheduled with a PUSCH within the $2^{nd}$ serving cell in the 28 GHz (e.g., max−rank=2) with the SRI/TPMI based on the $1^{st}$ set of RS resources. The UE may further report, that the UE may use the RS resource #1 and #2 within $1^{st}$ set of RS resources for a potentially scheduled $1^{st}$ layer and use the RS resources #3 and #4 within the $1^{st}$ set of RS resources for a potentially scheduled $2^{nd}$ layer.

In another example, the UE may be configured with a non-codebook-based $1^{st}$ set of RS resources including 4 RS resources within the $1^{st}$ serving cell in 28 GHz, and may be scheduled with a PUSCH within the $2^{nd}$ serving cell in 47 GHz (e.g., max−rank=4) with SRI/RI indicated with regard to the $1^{st}$ set of RS resources in the $1^{st}$ serving cell. The UE may further report that the UE may use each RS resource in the $1^{st}$ serving cell respectively for different layers regarding the PUSCH in the $2^{nd}$ serving cell. That is, the UE may further report that the UE may use the RS resource #1, #2, #3, #4 within the $1^{st}$ set of RS resources for a potentially scheduled $1^{st}$, $2^{nd}$, $3^{rd}$, and $4^{th}$ layer regarding the PUSCH in the $2^{nd}$ serving cell.

The reporting may be ordered by the network node via RRC signaling, a MAC-CE, and/or DCI, and the UE may report the UE capabilities of the cross frequency range/band SRI/TPMI indication and PUSCH scheduling via the RRC signaling, the MAC-CE, or the UCI. The UE may be RRC configured with the $1^{st}$ set of RS resources within the $1^{st}$ serving cell.

In one example, the UE may proactively report the capability, without receiving a separate order to report from the network node, based on determining that the $2^{nd}$ RS resource set is linked with the $1^{st}$ serving cell (e.g., through other gNB signaling). That is, reporting the UE capability may be inherently instructed based on receiving a configuration of the $2^{nd}$ serving cell linked with the $1^{st}$ serving cell, and the UE may report the UE capabilities to the network node.

In another example, network node order may be further RRC-configured within the $2^{nd}$ serving cell (e.g., indicating the $1^{st}$ serving cell ID, together with the ID of the $1^{st}$ set of RS resources), and the UE may report the UE capabilities for a single time via the RRC messaging.

In another example, the network node order may be further configured or activated via the RRC signaling, the MAC-CE, or the DCI (e.g., indicating the $1^{st}$ serving cell ID, together with the ID of the $1^{st}$ set of RS resources), and the UE may periodically or semi-persistently (P/SP) report the UE capabilities via the RRC signaling, the MAC-CE, or the UCI. For example, for a configured grant (CG) PUSCH configuration in the $2^{nd}$ serving cell, the UE may periodically or semi-persistently (P/SP) report the UE capabilities.

In another example, the network node order may be further indicated via the MAC-CE or the DCI associated with the $2^{nd}$ serving cell (e.g., indicating the $1^{st}$ serving cell ID, together with the ID of the $1^{st}$ set of RS resources), and the UE may report the UE capabilities a single time via the MAC-CE or the UCI.

Figure 7:
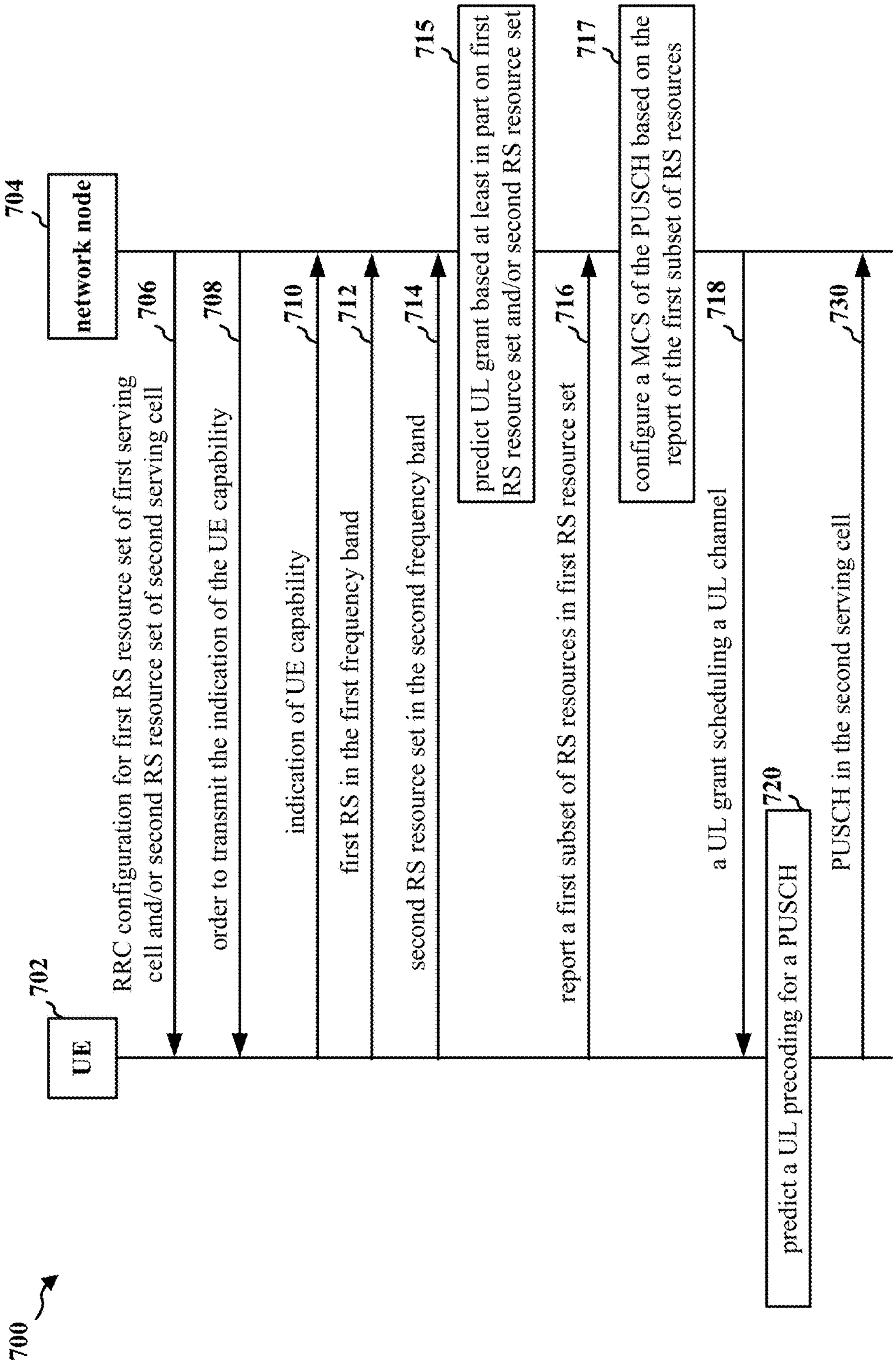
FIG. 7 is a call-flow diagram of method of wireless communication.

FIG. 7 is a call-flow diagram 700 of a method of wireless communication. The call-flow diagram 700 may include a UE 702 and a network node 704. The UE 702 may be configured to transmit an indication of UE capability to support a cross frequency range/band SRS indication for PUSCH scheduling to the network node 704. The UE 702 may transmit the indication of the UE capability to the network node 704, the indication of the UE capability including an association between a first RS transmitted in a first frequency band and a second frequency band, the second frequency band being different from the first frequency band, transmit the first RS in the first frequency band to the network node 704, and receive a UL grant scheduling a UL channel associated with the second frequency band from the network node 704, the UL grant being based at least in part on the first RS in the first frequency band. The network node 704 may receive the indication of the UE capability including an association between a first RS received in a first frequency band and a second frequency band, the second frequency band being different from the first frequency band, receive the first RS in the first frequency band from the UE 702, and transmit the UL grant scheduling the UL channel associated with the second frequency band for the UE 702, the UL grant being based at least in part on the first RS resource set in the first frequency band. Here, the second frequency band may be a higher frequency band than the first frequency band, and the UL channel may be a PUSCH.

At 706, the network node 704 may transmit an RRC configuration for the first RS resource set and/or the second RS resource set, the first RS resource set being associated with a first serving cell, and the second RS resource set being associated with a second serving cell. The UE 702 may receive an RRC configuration for the first RS resource set of the first serving cell and the second RS resource set of the second serving cell. In one example, the RRC configuration may include RRC configurations of the first RS resource set of the first serving cell and the second RS resource set of the second serving cell, the first RS resource set being associated with the UL grant of the second serving cell. In another example, the RRC configuration may include RRC configuration of the first RS resource set of the first serving cell, the first RS resource set being associated with the UL grant of the second serving cell.

In one aspect, the RRC configuration may include a dedicated RS configuration for the second RS resource set associated with the second serving cell linked with the first serving cell, and where the indication of the UE capability is transmitted based on the RRC configuration including the dedicated RS configuration (e.g., CrossFR-SRS type) for the second RS resource set. The UE 702 may be ordered to transmit the indication of the UE capability to the network node 704 based on receiving the dedicated RS configuration for the second RS resource set.

At 708, the network node 704 may transmit an order for the UE 702 to transmit the indication of the UE capability to the network node 704, the indication of the UE capability being received based on the order to transmit the indication of the UE capability. The UE 702 may receive an order to transmit the indication of the UE capability to the network node 704, the indication of the UE capability to the network node 704 being transmitted based on the order to transmit the indication of the UE capability. The order to transmit the indication of the UE capability may be transmitted/received via at least one of an RRC message, a first MAC-CE, or DCI, and the first subset of RS resources may be reported by the UE 702 to the network node 704 via at least one an RRC response, a second MAC-CE, or UCI.

In one example, a network node 704 order may be configured via RRC signaling within the $2^{nd}$ serving cell (e.g., indicating the $1^{st}$ serving cell ID, together with the IDs of the 1$^{st}$ and 2$^{nd}$ sets of RS resources), and the UE 702 may report the UE capabilities for a single time via the RRC messaging. In another example, the network node 704 order may be configured or activated via RRC signaling, a MAC-CE, or DCI (e.g., indicating the 1$^{st}$ serving cell ID, together with the IDs of the 1$^{st}$ and 2$^{nd}$ sets of RS resources), and the UE 702 may periodically or semi-persistently (P/SP) report the UE capabilities via the RRC signaling, the MAC-CE, or the DCI. In another example, the network node 704 order may be further indicated via the MAC-CE or the DCI associated with the 2$^{nd}$ serving cell (e.g., indicating the 1$^{st}$ serving cell ID, together with the IDs of the 1$^{st}$ and 2$^{nd}$ sets of RS resources), and the UE 702 may report the UE capabilities a single time via the MAC-CE or the UCI.

In one example, network node 704 order may be further RRC-configured within the 2$^{nd}$ serving cell (e.g., indicating the 1$^{st}$ serving cell ID, together with the ID of the 1$^{st}$ set of RS resources), and the UE 702 may report the UE capabilities for a single time via the RRC messaging. In another example, the network node 704 order may be further configured or activated via the RRC signaling, the MAC-CE, or the DCI (e.g., indicating the 1$^{st}$ serving cell ID, together with the ID of the 1$^{st}$ set of RS resources), and the UE 702 may periodically or semi-persistently (P/SP) report the UE capabilities via the RRC signaling, the MAC-CE, or the UCI. For example, for a configured grant (CG) PUSCH configuration in the 2$^{nd}$ serving cell, the UE 702 may periodically or semi-persistently (P/SP) report the UE capabilities. In another example, the network node 704 order may be further indicated via the MAC-CE or the DCI associated with the 2$^{nd}$ serving cell (e.g., indicating the 1$^{st}$ serving cell ID, together with the ID of the 1$^{st}$ set of RS resources), and the UE 702 may report the UE capabilities a single time via the MAC-CE or the UCI.

At 710, the UE 702 may transmit an indication of a UE capability to a network node 704, the indication of the UE capability including an association between a first RS in a first frequency band and a second frequency band. The network node 704 may receive an indication of a UE capability from a UE 702, the indication of the UE capability including an association between a first RS in a first frequency band and a second frequency band.

In one aspect, the indication of the UE capability may be transmitted to the network node 704 based on the order to transmit the indication of the UE capability received at 708. In another aspect, the UE 702 may proactively report the UE capability without receiving a separate order to report from the network node 704, and the indication of the UE capability may be transmitted to the network node 704 based on receiving the RRC configuration of the first RS resource set of the first serving cell. In one example, reporting of the UE capability may be inherently instructed based on receiving a configuration of the 2$^{nd}$ serving cell linked with the 1$^{st}$ serving cell and the 2$^{nd}$ RS resource set being associated with a dedicated RS usage type, and based on receiving the configuration of the 2$^{nd}$ RS resource set being associated with a dedicated RS usage type for cross frequency range/band SRI/TPMI indication and PUSCH scheduling, the UE 702 may report the UE capabilities to the network node 704. In another example, the UE 702 may proactively report the capability, without receiving a separate order to report from the network node 704, based on determining that the 2$^{nd}$ RS resource set is linked with the 1$^{st}$ serving cell (e.g., through other gNB signaling). That is, reporting the UE capability may be inherently instructed based on receiving a configuration of the 2$^{nd}$ serving cell linked with the 1$^{st}$ serving cell, and the UE 702 may report the UE capabilities to the network node 704.

In some aspects, the UE capability may include information associated with a first set of antenna elements of the UE 702 and a second set of antenna elements of the UE 702, where the first set of antenna elements is associated with the first frequency band and the second set of antenna elements is associated with the second frequency band.

In one aspect, the second set of antenna elements may be located in a second antenna panel of the UE 702. The information may include at least one of a distance between the first set of antenna elements and the second antenna panel, one or more directionalities of the first set of antenna elements and the second antenna panel, or a second association between a first TX beamforming angle spread of the first set of antenna elements and a second TX beamforming angle spread of the second antenna panel.

In another aspect, the first set of antenna elements and the second set of antenna elements may be located on the same antenna panel. The information may include at least one of a first number of the first set of antenna elements and a second number of the second set of antenna elements on the antenna panel, a pattern of the first set of antenna elements and the second set of antenna elements on the antenna panel, or a coupling loss difference between the first set of antenna elements and the second set of antenna elements.

In some aspects, the indication of the UE capability may include a capability of the UE 702 to receive the UL grant within a second serving cell associated with the second frequency band.

At 712, the UE 702 may transmit the first RS in the first frequency band to the network node 704. The network node 704 may receive the first RS in the first frequency band from the UE 702.

At 714, the UE 702 may transmit a second RS resource set in the second frequency band, the second RS resource set being transmitted with a lower periodicity than the first RS resource set. The network node 704 may receive a second RS resource set in the second frequency band, the second RS resource set being transmitted with a lower periodicity than the first RS resource set.

The first frequency band may be associated with a first serving cell and the second frequency band may be associated with a second serving cell. Here, the indication of the UE capability may indicate a capability of the UE 702 to receive the UL grant, the UL grant being based at least in part on the first RS resource set and the second RS resource set.

At 715, the network may predict the UL grant based at least in part on the first RS resource set and the second RS resource set. That is, the network entity may be configured to determine SRS indications for UL grant in the second frequency band, based on the indications of the UE capabilities received at 712 and/or 714. The UL grant may include at least one of a SRI and/or a TPMI associated with the second RS resource set determined based on the first RS resource set and/or the second RS resource set.

At 716, the UE 702 may report a first subset of RS resources in the first RS resource set associated with a second subset of RS resources in the second RS resource set, the first subset of RS resources simulating the second subset of RS resources. The network node 704 may receive a report of a first subset of RS resources in the first RS resource set associated with a second subset of RS resources in the second RS resource set, the first subset of RS resources simulating the second subset of RS resources.

In one example, the report of the first subset of RS resource may indicate a connection between a first subset of the RS resources within the first set of RS resources and a certain PUSCH layer scheduled within the $2^{nd}$ serving cell. In another example, the first subset of RS resources may include a complete set of the first RS resource set.

At 717, the network node 704 may configure a MCS of the PUSCH based on the report of the first subset of RS resources received at 716. That is, the MCS of the PUSCH may be based on the report of the first subset of RS resources.

At 718, the network node 704 may transmit a UL grant scheduling a UL channel associated with the second frequency band for the UE 702, the UL grant being based at least in part on the first RS resource set in the first frequency band. The UE 702 may receive a UL grant scheduling a UL channel associated with the second frequency band from the network node 704, the UL grant being based at least in part on the first RS resource set in the first frequency band. The UL grant may include at least one of a SRI or a TPMI associated with the first RS resource set.

At 720, the UE 702 may predict a UL precoding for a PUSCH within the second serving cell based on the at least one of the SRI or the TPMI associated with the first RS resource set received at 718. That is, the UE 702 may determine the UL precoding for the PUSCH within the second serving cell based on the at least one of the SRI or the TPMI associated with the first RS resource set received from the network node 704.

At 730, the UE 702 may transmit a PUSCH within the second serving cell with a UL precoding associated with the UL grant based on the UL precoding for a PUSCH predicted based on the at least one of the SRI or the TPMI received at 718. The network node 704 may receive a PUSCH within the second serving cell with a UL precoding associated with the UL grant based on the at least one of the SRI or the TPMI associated with the first RS resource set of the UL grant transmitted at 718.

Figure 8:
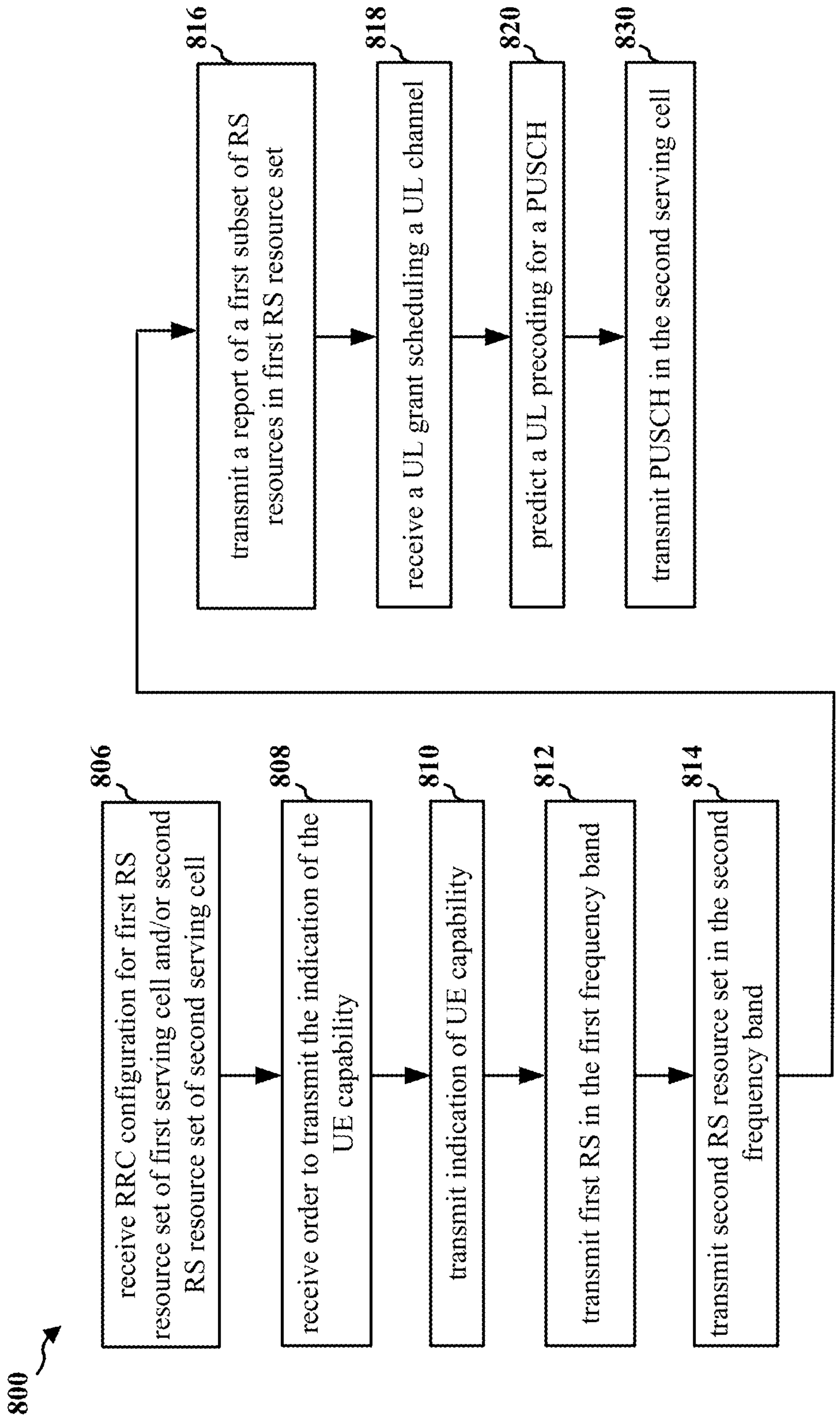
FIG. 8 is a flowchart of a method of wireless communication.

FIG. 8 is a flowchart 800 of a method of wireless communication. The method may be performed by a UE (e.g., the UE 104; the apparatus 1204). The UE may be configured to transmit an indication of UE capability to support a cross frequency range/band SRS indication for PUSCH scheduling to a network node. The UE may transmit the indication of the UE capability to the network node, the indication of the UE capability including an association between a first RS transmitted in a first frequency band and a second frequency band, the second frequency band being different from the first frequency band, transmit the first RS resource set in the first frequency band to the network node, and receive a UL grant scheduling a UL channel associated with the second frequency band from the network node, the UL grant being based at least in part on the first RS in the first frequency band.

At 806, the UE may receive an RRC configuration for the first RS resource set of the first serving cell and the second RS resource set of the second serving cell. In one example, the RRC configuration may include RRC configurations of the first RS resource set of the first serving cell and the second RS resource set of the second serving cell, the first RS resource set being associated with the UL grant of the second serving cell. In another example, the RRC configuration may include RRC configuration of the first RS resource set of the first serving cell, the first RS resource set being associated with the UL grant of the second serving cell. In one aspect, the RRC configuration may include a dedicated RS configuration for the second RS resource set associated with the second serving cell linked with the first serving cell, and where the indication of the UE capability is transmitted based on the RRC configuration including the dedicated RS configuration (e.g., CrossFR-SRS type) for the second RS resource set. The UE may be ordered to transmit the indication of the UE capability to the network node based on receiving the dedicated RS configuration for the second RS resource set. For example, at 706, the UE 702 may receive an RRC configuration for the first RS resource set of the first serving cell and the second RS resource set of the second serving cell. Furthermore, 806 may be performed by a cross frequency/band SRS indication component 198.

At 808, the UE may receive an order to transmit the indication of the UE capability to the network node, the indication of the UE capability to the network node being transmitted based on the order to transmit the indication of the UE capability. The order to transmit the indication of the UE capability may be transmitted/received via at least one of an RRC message, a first MAC-CE, or DCI, and the first subset of RS resources may be reported by the UE to the network node via at least one an RRC response, a second MAC-CE, or UCI. For example, at 708, the UE 702 may receive an order to transmit the indication of the UE capability to the network node 704, the indication of the UE capability to the network node 704 being transmitted based on the order to transmit the indication of the UE capability. Furthermore, 808 may be performed by the cross frequency/band SRS indication component 198.

In one example, a network node order may be configured via RRC signaling within the $2^{nd}$ serving cell (e.g., indicating the $1^{st}$ serving cell ID, together with the IDs of the $1^{st}$ and $2^{nd}$ sets of RS resources), and the UE may report the UE capabilities for a single time via the RRC messaging. In another example, the network node order may be configured or activated via RRC signaling, a MAC-CE, or DCI (e.g., indicating the $1^{st}$ serving cell ID, together with the IDs of the $1^{st}$ and $2^{nd}$ sets of RS resources), and the UE may periodically or semi-persistently (P/SP) report the UE capabilities via the RRC signaling, the MAC-CE, or the DCI. In another example, the network node order may be further indicated via the MAC-CE or the DCI associated with the $2^{nd}$ serving cell (e.g., indicating the $1^{st}$ serving cell ID, together with the IDs of the $1^{st}$ and $2^{nd}$ sets of RS resources), and the UE may report the UE capabilities a single time via the MAC-CE or the UCI.

In one example, network node order may be further RRC-configured within the $2^{nd}$ serving cell (e.g., indicating the $1^{st}$ serving cell ID, together with the ID of the $1^{st}$ set of RS resources), and the UE may report the UE capabilities for a single time via the RRC messaging. In another example, the network node order may be further configured or activated via the RRC signaling, the MAC-CE, or the DCI (e.g., indicating the $1^{st}$ serving cell ID, together with the ID of the $1^{st}$ set of RS resources), and the UE may periodically or semi-persistently (P/SP) report the UE capabilities via the RRC signaling, the MAC-CE, or the UCI. For example, for a configured grant (CG) PUSCH configuration in the $2^{nd}$ serving cell, the UE may periodically or semi-persistently (P/SP) report the UE capabilities. In another example, the network node order may be further indicated via the MAC-CE or the DCI associated with the $2^{nd}$ serving cell (e.g., indicating the $1^{st}$ serving cell ID, together with the ID of the $1^{st}$ set of RS resources), and the UE may report the UE capabilities a single time via the MAC-CE or the UCI.

At 810, the UE may transmit an indication of a UE capability to a network node, the indication of the UE capability including an association between a first RS in a first frequency band and a second frequency band. For example, at 710, the UE 702 may transmit an indication of a UE capability to a network node 704, the indication of the UE capability including an association between a first RS resource set in a first frequency band and a second frequency band. Furthermore, 810 may be performed by the cross frequency/band SRS indication component 198.

In one aspect, the indication of the UE capability may be transmitted to the network node based on the order to transmit the indication of the UE capability received at 708. In another aspect, the UE may proactively report the UE capability without receiving a separate order to report from the network node, and the indication of the UE capability may be transmitted to the network node based on receiving the RRC configuration of the first RS resource set of the first serving cell. In one example, reporting of the UE capability may be inherently instructed based on receiving a configuration of the $2^{nd}$ serving cell linked with the $1^{st}$ serving cell and the $2^{nd}$ RS resource set being associated with a dedicated RS usage type, and based on receiving the configuration of the $2^{nd}$ RS resource set being associated with a dedicated RS usage type for cross frequency range/band SRI/TPMI indication and PUSCH scheduling, the UE may report the UE capabilities to the network node. In another example, the UE may proactively report the capability, without receiving a separate order to report from the network node, based on determining that the $2^{nd}$ RS resource set is linked with the $1^{st}$ serving cell (e.g., through other gNB signaling). That is, reporting the UE capability may be inherently instructed based on receiving a configuration of the $2^{nd}$ serving cell linked with the $1^{st}$ serving cell, and the UE may report the UE capabilities to the network node.

In some aspects, the UE capability may include information associated with a first set of antenna elements of the UE and a second set of antenna elements of the UE, where the first set of antenna elements is associated with the first frequency band and the second set of antenna elements is associated with the second frequency band.

In one aspect, the second set of antenna elements may be located in a second antenna panel of the UE. The information may include at least one of a distance between the first set of antenna elements and the second antenna panel, one or more directionalities of the first set of antenna elements and the second antenna panel, or a second association between a first TX beamforming angle spread of the first set of antenna elements and a second TX beamforming angle spread of the second antenna panel.

In another aspect, the first set of antenna elements and the second set of antenna elements may be located on the same antenna panel. The information may include at least one of a first number of the first set of antenna elements and a second number of the second set of antenna elements on the antenna panel, a pattern of the first set of antenna elements and the second set of antenna elements on the antenna panel, or a coupling loss difference between the first set of antenna elements and the second set of antenna elements.

In some aspects, the indication of the UE capability may include a capability of the UE to receive the UL grant within a second serving cell associated with the second frequency band.

At 812, the UE may transmit the first RS in the first frequency band to the network node. For example, at 712, the UE 702 may transmit the first RS in the first frequency band to the network node 704. Furthermore, 812 may be performed by the cross frequency/band SRS indication component 198.

At 814, the UE may transmit a second RS resource set in the second frequency band, the second RS resource set being transmitted with a lower periodicity than the first RS resource set. The first frequency band may be associated with a first serving cell and the second frequency band may be associated with a second serving cell. Here, the indication of the UE capability may indicate a capability of the UE to receive the UL grant, the UL grant being based at least in part on the first RS resource set and the second RS resource set. For example, at 714, the UE 702 may transmit a second RS resource set in the second frequency band, the second RS resource set being transmitted with a lower periodicity than the first RS resource set. Furthermore, 814 may be performed by the cross frequency/band SRS indication component 198.

At 816, the UE may report a first subset of RS resources in the first RS resource set associated with a second subset of RS resources in the second RS resource set, the first subset of RS resources simulating the second subset of RS resources. In one example, the report of the first subset of RS resource may indicate a connection between a first subset of the RS resources within the first set of RS resources and a certain PUSCH layer scheduled within the $2^{nd}$ serving cell. In another example, the first subset of RS resources may include a complete set of the first RS resource set. For example, at 716, the UE 702 may report a first subset of RS resources in the first RS resource set associated with a second subset of RS resources in the second RS resource set, the first subset of RS resources simulating the second subset of RS resources. Furthermore, 816 may be performed by the cross frequency/band SRS indication component 198.

At 818, the UE may receive a UL grant scheduling a UL channel associated with the second frequency band from the network node, the UL grant being based at least in part on the first RS resource set in the first frequency band. The UL grant may include at least one of a SRI or a TPMI associated with the first RS resource set. For example, at 718, the UE 702 may receive a UL grant scheduling a UL channel associated with the second frequency band from the network node 704, the UL grant being based at least in part on the first RS resource set in the first frequency band. Furthermore, 818 may be performed by the cross frequency/band SRS indication component 198.

At 820, the UE may predict a UL precoding for a PUSCH within the second serving cell based on the at least one of the SRI or the TPMI associated with the first RS resource set received at 818. For example, at 720, the UE 702 may predict a UL precoding for a PUSCH within the second serving cell based on the at least one of the SRI or the TPMI associated with the first RS resource set received at 718. Furthermore, 820 may be performed by the cross frequency/band SRS indication component 198.

At 830, the UE may transmit a PUSCH within the second serving cell with a UL precoding associated with the UL grant based on the UL precoding for a PUSCH predicted based on the at least one of the SRI or the TPMI received at 818. For example, at 730, the UE 702 may transmit a PUSCH within the second serving cell with a UL precoding associated with the UL grant based on the UL precoding for a PUSCH predicted based on the at least one of the SRI or the TPMI received at 718. Furthermore, 830 may be performed by the cross frequency/band SRS indication component 198.

Figure 9:
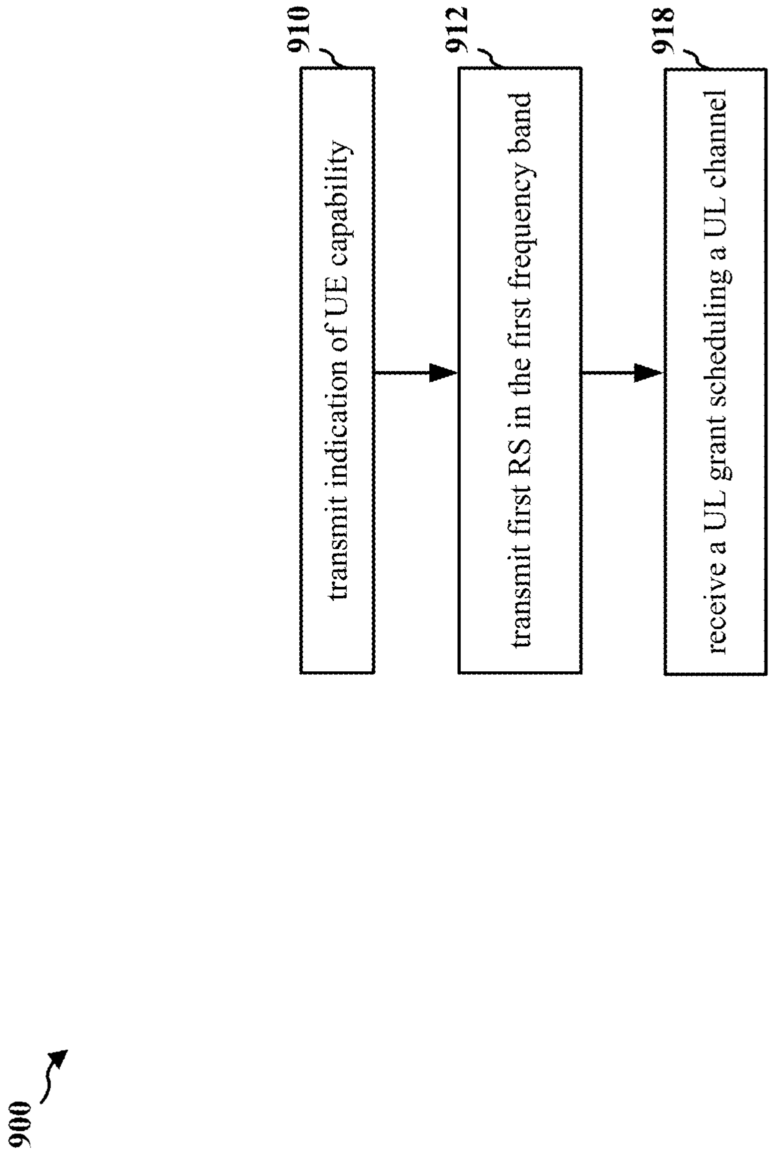
FIG. 9 is a flowchart of a method of wireless communication.

FIG. 9 is a flowchart 900 of a method of wireless communication. The method may be performed by a UE (e.g., the UE 104; the apparatus 1204). The UE may be configured to transmit an indication of UE capability to support a cross frequency range/band SRS indication for PUSCH scheduling to a network node. The UE may transmit the indication of the UE capability to the network node, the indication of the UE capability including an association between a first RS transmitted in a first frequency band and a second frequency band, the second frequency band being different from the first frequency band, transmit the first RS resource set in the first frequency band to the network node, and receive a UL grant scheduling a UL channel associated with the second frequency band from the network node, the UL grant being based at least in part on the first RS in the first frequency band.

At 910, the UE may transmit an indication of a UE capability to a network node, the indication of the UE capability including an association between a first RS in a first frequency band and a second frequency band. For example, at 710, the UE 702 may transmit an indication of a UE capability to a network node 704, the indication of the UE capability including an association between a first RS resource set in a first frequency band and a second frequency band. Furthermore, 910 may be performed by the cross frequency/band SRS indication component 198.

In one aspect, the indication of the UE capability may be transmitted to the network node based on the order to transmit the indication of the UE capability received at 708. In another aspect, the UE may proactively report the UE capability without receiving a separate order to report from the network node, and the indication of the UE capability may be transmitted to the network node based on receiving the RRC configuration of the first RS resource set of the first serving cell. In one example, reporting of the UE capability may be inherently instructed based on receiving a configuration of the $2^{nd}$ serving cell linked with the $1^{st}$ serving cell and the $2^{nd}$ RS resource set being associated with a dedicated RS usage type, and based on receiving the configuration of the $2^{nd}$ RS resource set being associated with a dedicated RS usage type for cross frequency range/band SRI/TPMI indication and PUSCH scheduling, the UE may report the UE capabilities to the network node. In another example, the UE may proactively report the capability, without receiving a separate order to report from the network node, based on determining that the $2^{nd}$ RS resource set is linked with the $1^{st}$ serving cell (e.g., through other gNB signaling). That is, reporting the UE capability may be inherently instructed based on receiving a configuration of the $2^{nd}$ serving cell linked with the $1^{st}$ serving cell, and the UE may report the UE capabilities to the network node.

In some aspects, the UE capability may include information associated with a first set of antenna elements of the UE and a second set of antenna elements of the UE, where the first set of antenna elements is associated with the first frequency band and the second set of antenna elements is associated with the second frequency band.

In one aspect, the second set of antenna elements may be located in a second antenna panel of the UE. The information may include at least one of a distance between the first set of antenna elements and the second antenna panel, one or more directionalities of the first set of antenna elements and the second antenna panel, or a second association between a first TX beamforming angle spread of the first set of antenna elements and a second TX beamforming angle spread of the second antenna panel.

In another aspect, the first set of antenna elements and the second set of antenna elements may be located on the same antenna panel. The information may include at least one of a first number of the first set of antenna elements and a second number of the second set of antenna elements on the antenna panel, a pattern of the first set of antenna elements and the second set of antenna elements on the antenna panel, or a coupling loss difference between the first set of antenna elements and the second set of antenna elements.

In some aspects, the indication of the UE capability may include a capability of the UE to receive the UL grant within a second serving cell associated with the second frequency band.

At 912, the UE may transmit the first RS in the first frequency band to the network node. For example, at 712, the UE 702 may transmit the first RS in the first frequency band to the network node 704. Furthermore, 912 may be performed by the cross frequency/band SRS indication component 198.

At 918, the UE may receive a UL grant scheduling a UL channel associated with the second frequency band from the network node, the UL grant being based at least in part on the first RS resource set in the first frequency band. The UL grant may include at least one of a SRI or a TPMI associated with the first RS resource set. For example, at 718, the UE 702 may receive a UL grant scheduling a UL channel associated with the second frequency band from the network node 704, the UL grant being based at least in part on the first RS resource set in the first frequency band. Furthermore, 918 may be performed by the cross frequency/band SRS indication component 198.

Figure 10:
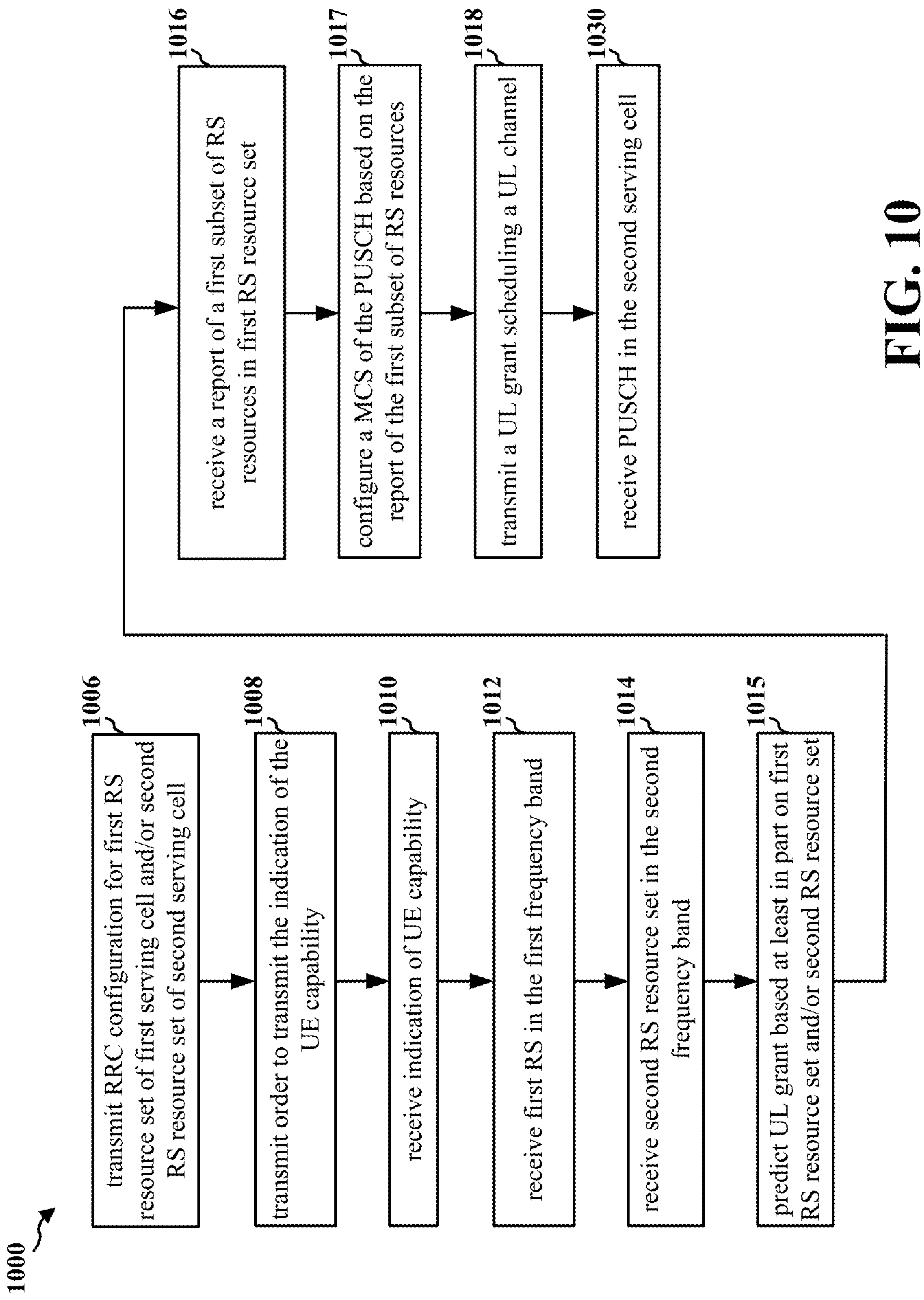
FIG. 10 is a flowchart of a method of wireless communication.

FIG. 10 is a flowchart 1000 of a method of wireless communication. The method may be performed by a network node (e.g., the base station 102; the network entity 1302/1460). The network node may receive the indication of the UE capability including an association between a first RS received in a first frequency band and a second frequency band, the second frequency band being different from the first frequency band, receive the first RS in the first frequency band from a UE, and transmit the UL grant scheduling the UL channel associated with the second frequency band for the UE, the UL grant being based at least in part on the first RS resource set in the first frequency band. Here, the second frequency band may be a higher frequency band than the first frequency band, and the UL channel may be a PUSCH.

At 1006, the network node may transmit an RRC configuration for the first RS resource set and/or the second RS resource set, the first RS resource set being associated with a first serving cell, and the second RS resource set being associated with a second serving cell. In one example, the RRC configuration may include RRC configurations of the first RS resource set of the first serving cell and the second RS resource set of the second serving cell, the first RS resource set being associated with the UL grant of the second serving cell. In another example, the RRC configuration may include RRC configuration of the first RS resource set of the first serving cell, the first RS resource set being associated with the UL grant of the second serving cell. In one aspect, the RRC configuration may include a dedicated RS configuration for the second RS resource set associated with the second serving cell linked with the first serving cell, and where the indication of the UE capability is transmitted based on the RRC configuration including the dedicated RS configuration (e.g., CrossFR-SRS type) for the second RS resource set. The UE may be ordered to transmit the indication of the UE capability to the network node based on receiving the dedicated RS configuration for the second RS resource set. For example, at 706, the network node 704 may transmit an RRC configuration for the first RS resource set and/or the second RS resource set, the first RS resource set being associated with a first serving cell, and the second RS resource set being associated with a second serving cell. Furthermore, 1006 may be performed by a cross frequency/band SRS indication component 199.

At 1008, the network node may transmit an order for the UE to transmit the indication of the UE capability to the network node, the indication of the UE capability being received based on the order to transmit the indication of the UE capability. The order to transmit the indication of the UE capability may be transmitted/received via at least one of an RRC message, a first MAC-CE, or DCI, and the first subset of RS resources may be reported by the UE to the network node via at least one an RRC response, a second MAC-CE, or UCI. For example, at 708, the network node 704 may transmit an order for the UE 702 to transmit the indication of the UE capability to the network node 704, the indication of the UE capability being received based on the order to transmit the indication of the UE capability. Furthermore, 1008 may be performed by the cross frequency/band SRS indication component 199.

In one example, a network node order may be configured via RRC signaling within the $2^{nd}$ serving cell (e.g., indicating the $1^{st}$ serving cell ID, together with the IDs of the $1^{st}$ and $2^{nd}$ sets of RS resources), and the UE may report the UE capabilities for a single time via the RRC messaging. In another example, the network node order may be configured or activated via RRC signaling, a MAC-CE, or DCI (e.g., indicating the $1^{st}$ serving cell ID, together with the IDs of the $1^{st}$ and $2^{nd}$ sets of RS resources), and the UE may periodically or semi-persistently (P/SP) report the UE capabilities via the RRC signaling, the MAC-CE, or the DCI. In another example, the network node order may be further indicated via the MAC-CE or the DCI associated with the $2^{nd}$ serving cell (e.g., indicating the $1^{st}$ serving cell ID, together with the IDs of the $1^{st}$ and $2^{nd}$ sets of RS resources), and the UE may report the UE capabilities a single time via the MAC-CE or the UCI.

In one example, network node order may be further RRC-configured within the $2^{nd}$ serving cell (e.g., indicating the $1^{st}$ serving cell ID, together with the ID of the $1^{st}$ set of RS resources), and the UE may report the UE capabilities for a single time via the RRC messaging. In another example, the network node order may be further configured or activated via the RRC signaling, the MAC-CE, or the DCI (e.g., indicating the $1^{st}$ serving cell ID, together with the ID of the $1^{st}$ set of RS resources), and the UE may periodically or semi-persistently (P/SP) report the UE capabilities via the RRC signaling, the MAC-CE, or the UCI. For example, for a configured grant (CG) PUSCH configuration in the $2^{nd}$ serving cell, the UE may periodically or semi-persistently (P/SP) report the UE capabilities. In another example, the network node order may be further indicated via the MAC-CE or the DCI associated with the $2^{nd}$ serving cell (e.g., indicating the $1^{st}$ serving cell ID, together with the ID of the $1^{st}$ set of RS resources), and the UE may report the UE capabilities a single time via the MAC-CE or the UCI.

At 1010, the network node may receive an indication of a UE capability from a UE, the indication of the UE capability including an association between a first RS in a first frequency band and a second frequency band. For example, at 710, the network node 704 may receive an indication of a UE capability from a UE 702, the indication of the UE capability including an association between a first RS in a first frequency band and a second frequency band. Furthermore, 1010 may be performed by the cross frequency/band SRS indication component 199.

In one aspect, the indication of the UE capability may be transmitted to the network node based on the order to transmit the indication of the UE capability received at 1008. In another aspect, the UE may proactively report the UE capability without receiving a separate order to report from the network node, and the indication of the UE capability may be transmitted to the network node based on receiving the RRC configuration of the first RS resource set of the first serving cell. In one example, reporting of the UE capability may be inherently instructed based on receiving a configuration of the $2^{nd}$ serving cell linked with the $1^{st}$ serving cell and the $2^{nd}$ RS resource set being associated with a dedicated RS usage type, and based on receiving the configuration of the $2^{nd}$ RS resource set being associated with a dedicated RS usage type for cross frequency range/band SRI/TPMI indication and PUSCH scheduling, the UE may report the UE capabilities to the network node. In another example, the UE may proactively report the capability, without receiving a separate order to report from the network node, based on determining that the $2^{nd}$ RS resource set is linked with the $1^{st}$ serving cell (e.g., through other gNB signaling). That is, reporting the UE capability may be inherently instructed based on receiving a configuration of the $2^{nd}$ serving cell linked with the $1^{st}$ serving cell, and the UE may report the UE capabilities to the network node.

In some aspects, the UE capability may include information associated with a first set of antenna elements of the UE and a second set of antenna elements of the UE, where the first set of antenna elements is associated with the first frequency band and the second set of antenna elements is associated with the second frequency band.

In one aspect, the second set of antenna elements may be located in a second antenna panel of the UE. The information may include at least one of a distance between the first antenna panel and the second antenna panel, one or more directionalities of the first set of antenna elements and the second antenna panel, or a second association between a first TX beamforming angle spread of the first set of antenna elements and a second TX beamforming angle spread of the second antenna panel.

In another aspect, the first set of antenna elements and the second set of antenna elements may be located on the same antenna panel. The information may include at least one of a first number of the first set of antenna elements and a second number of the second set of antenna elements on the antenna panel, a pattern of the first set of antenna elements and the second set of antenna elements on the antenna panel, or a coupling loss difference between the first set of antenna elements and the second set of antenna elements.

In some aspects, the indication of the UE capability may include a capability of the UE to receive the UL grant within a second serving cell associated with the second frequency band.

At 1012, the network node may receive the first RS in the first frequency band from the UE. For example, at 712, the network node 704 may receive the first RS in the first frequency band from the UE 702. Furthermore, 1012 may be performed by the cross frequency/band SRS indication component 199.

At 1014, the network node may receive a second RS resource set in the second frequency band, the second RS resource set being transmitted with a lower periodicity than the first RS resource set. Here, the indication of the UE capability may indicate a capability of the UE to receive the UL grant, the UL grant being based at least in part on the first RS resource set and the second RS resource set. For example, at 714, the network node 704 may receive a second RS resource set in the second frequency band, the second RS resource set being transmitted with a lower periodicity than the first RS resource set. Furthermore, 1014 may be performed by the cross frequency/band SRS indication component 199.

At 1015, the network node may predict the UL grant based at least in part on the first RS resource set and the second RS resource set. That is, the network entity may be configured to determine SRS indications for UL grant in the second frequency band, based on the indications of the UE capabilities received at 1012 and/or 1014. The UL grant may include at least one of a SRI and/or a TPMI associated with the second RS resource set determined based on the first RS resource set and/or the second RS resource set. For example, at 715, the network node 704 may predict the UL grant based at least in part on the first RS resource set and the second RS resource set. Furthermore, 1015 may be performed by the cross frequency/band SRS indication component 199.

At 1016, the network node may receive a report of a first subset of RS resources in the first RS resource set associated with a second subset of RS resources in the second RS resource set, the first subset of RS resources simulating the second subset of RS resources. In one example, the report of the first subset of RS resource may indicate a connection between a first subset of the RS resources within the first set of RS resources and a certain PUSCH layer scheduled within the $2^{nd}$ serving cell. In another example, the first subset of RS resources may include a complete set of the first RS resource set. For example, at 716, the network node 704 may receive a report of a first subset of RS resources in the first RS resource set associated with a second subset of RS resources in the second RS resource set, the first subset of RS resources simulating the second subset of RS resources. Furthermore, 1016 may be performed by the cross frequency/band SRS indication component 199.

At 1017, the network node may the network node may configure a MCS of the PUSCH based on the report of the first subset of RS resources received at 1016. That is, the MCS of the PUSCH may be based on the report of the first subset of RS resources. For example, at 717, the network node 704 may the network node 704 may configure a MCS of the PUSCH based on the report of the first subset of RS resources received at 716. Furthermore, 1017 may be performed by the cross frequency/band SRS indication component 199.

At 1018, the network node may transmit a UL grant scheduling a UL channel associated with the second frequency band for the UE, the UL grant being based at least in part on the first RS resource set in the first frequency band. The UL grant may include at least one of a SRI or a TPMI associated with the first RS resource set. For example, at 718, the network node 704 may transmit a UL grant scheduling a UL channel associated with the second frequency band for the UE 702, the UL grant being based at least in part on the first RS resource set in the first frequency band. Furthermore, 1018 may be performed by the cross frequency/band SRS indication component 199.

At 1030, the network node may receive a PUSCH within the second serving cell with a UL precoding associated with the UL grant based on the at least one of the SRI or the TPMI associated with the first RS resource set of the UL grant transmitted at 1018. For example, at 730, the network node 704 may receive a PUSCH within the second serving cell with a UL precoding associated with the UL grant based on the at least one of the SRI or the TPMI associated with the first RS resource set of the UL grant transmitted at 718. Furthermore, 1030 may be performed by the cross frequency/band SRS indication component 199.

Figure 11:
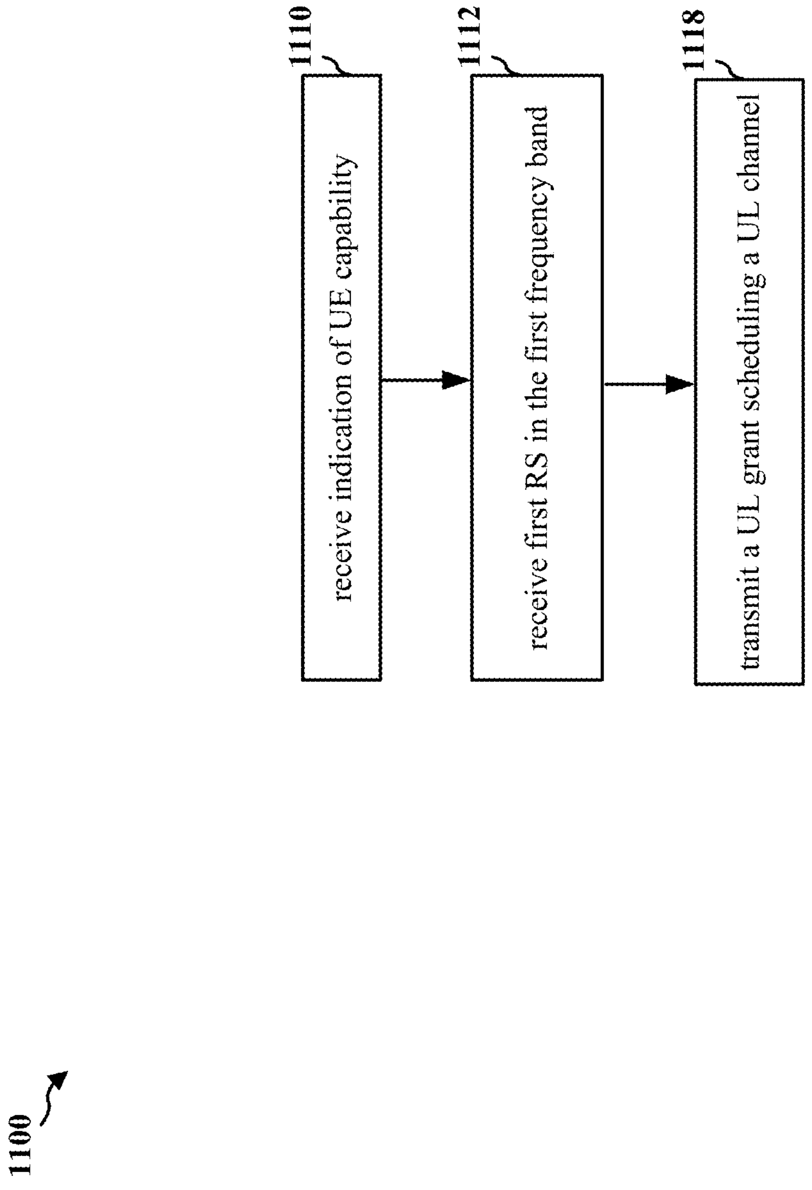
FIG. 11 is a flowchart of a method of wireless communication.

FIG. 11 is a flowchart 1100 of a method of wireless communication. The method may be performed by a network node (e.g., the base station 102; the network entity 1302/1460). The network node may receive the indication of the UE capability including an association between a first RS received in a first frequency band and a second frequency band, the second frequency band being different from the first frequency band, receive the first RS in the first frequency band from a UE, and transmit the UL grant scheduling the UL channel associated with the second frequency band for the UE, the UL grant being based at least in part on the first RS resource set in the first frequency band. Here, the second frequency band may be a higher frequency band than the first frequency band, and the UL channel may be a PUSCH.

At 1110, the network node may receive an indication of a UE capability from a UE, the indication of the UE capability including an association between a first RS in a first frequency band and a second frequency band. For example, at 710, the network node 704 may receive an indication of a UE capability from a UE 702, the indication of the UE capability including an association between a first RS in a first frequency band and a second frequency band. Furthermore, 1110 may be performed by the cross frequency/band SRS indication component 199.

In one aspect, the indication of the UE capability may be transmitted to the network node based on the order to transmit the indication of the UE capability received at 1108. In another aspect, the UE may proactively report the UE capability without receiving a separate order to report from the network node, and the indication of the UE capability may be transmitted to the network node based on receiving the RRC configuration of the first RS resource set of the first serving cell. In one example, reporting of the UE capability may be inherently instructed based on receiving a configuration of the $2^{nd}$ serving cell linked with the $1^{st}$ serving cell and the $2^{nd}$ RS resource set being associated with a dedicated RS usage type, and based on receiving the configuration of the $2^{nd}$ RS resource set being associated with a dedicated RS usage type for cross frequency range/band SRI/TPMI indication and PUSCH scheduling, the UE may report the UE capabilities to the network node. In another example, the UE may proactively report the capability, without receiving a separate order to report from the network node, based on determining that the $2^{nd}$ RS resource set is linked with the $1^{st}$ serving cell (e.g., through other gNB signaling). That is, reporting the UE capability may be inherently instructed based on receiving a configuration of the $2^{nd}$ serving cell linked with the $1^{st}$ serving cell, and the UE may report the UE capabilities to the network node.

In some aspects, the UE capability may include information associated with a first set of antenna elements of the UE and a second set of antenna elements of the UE, where the first set of antenna elements is associated with the first frequency band and the second set of antenna elements is associated with the second frequency band.

In one aspect, the second set of antenna elements may be located in a second antenna panel of the UE. The information may include at least one of a distance between the first set of antenna elements and the second antenna panel, one or more directionalities of the first set of antenna elements and the second antenna panel, or a second association between a first TX beamforming angle spread of the first set of antenna elements and a second TX beamforming angle spread of the second antenna panel.

In another aspect, the first set of antenna elements and the second set of antenna elements may be located on the same antenna panel. The information may include at least one of a first number of the first set of antenna elements and a second number of the second set of antenna elements on the antenna panel, a pattern of the first set of antenna elements and the second set of antenna elements on the antenna panel, or a coupling loss difference between the first set of antenna elements and the second set of antenna elements.

In some aspects, the indication of the UE capability may include a capability of the UE to receive the UL grant within a second serving cell associated with the second frequency band.

At 1112, the network node receive the first RS in the first frequency band from the UE. For example, at 712, the network node 704 may receive the first RS in the first frequency band from the UE 702. Furthermore, 1112 may be performed by the cross frequency/band SRS indication component 199.

At 1118, the network node may transmit a UL grant scheduling a UL channel associated with the second frequency band for the UE, the UL grant being based at least in part on the first RS resource set in the first frequency band. The UL grant may include at least one of a SRI or a TPMI associated with the first RS resource set. For example, at 718, the network node 704 may transmit a UL grant scheduling a UL channel associated with the second frequency band for the UE 702, the UL grant being based at least in part on the first RS resource set in the first frequency band. Furthermore, 1118 may be performed by the cross frequency/band SRS indication component 199.

Figure 12:
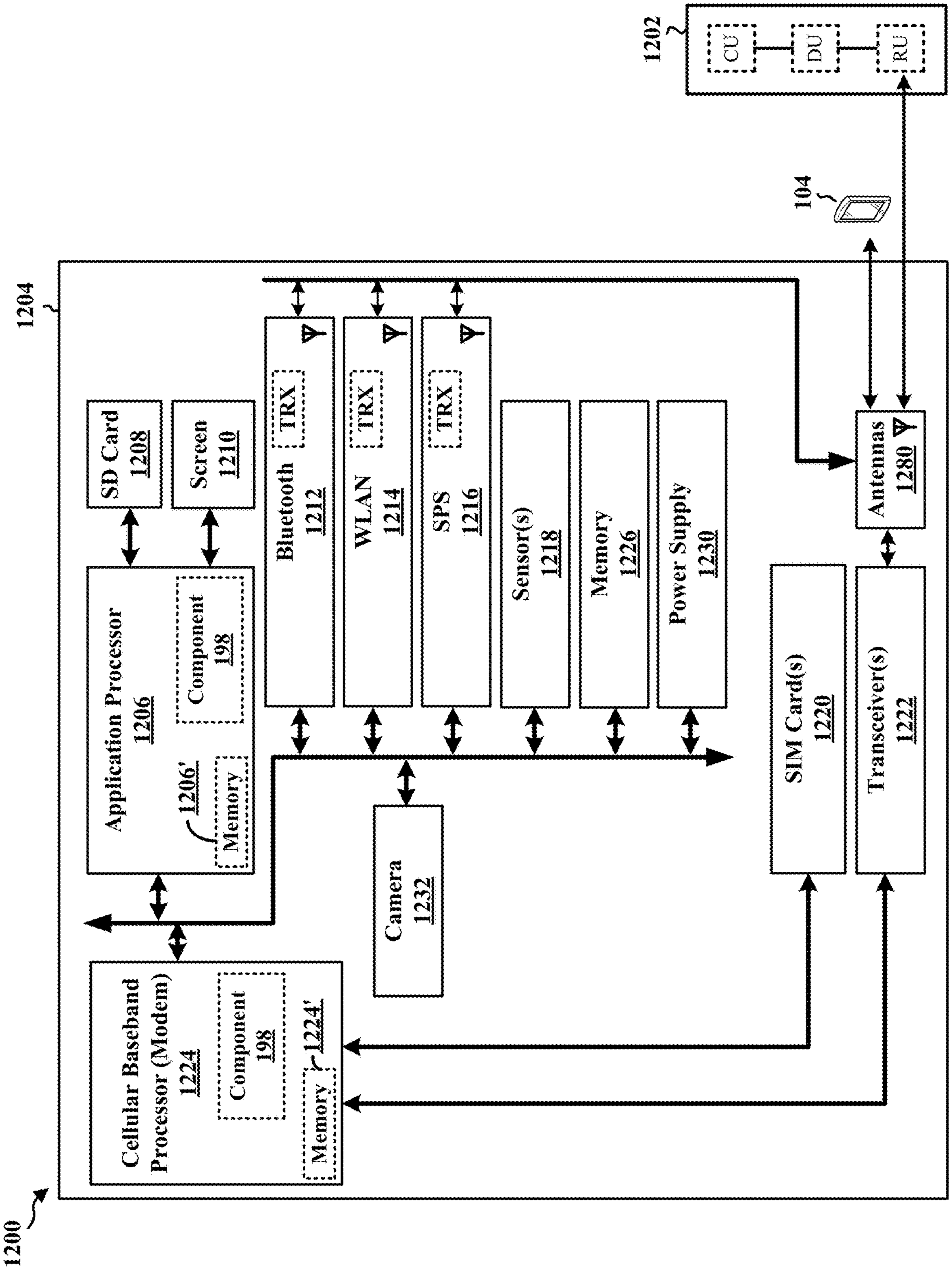
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

As discussed supra, the cross frequency/band SRS indication component 198 is configured to transmit an indication of a UE capability to a network node, the indication of the UE capability including an association between a first RS transmitted in a first frequency band and a second frequency band, the second frequency band being different from the first frequency band, transmit the first RS in the first frequency band to the network node, and receive a UL grant scheduling a UL channel associated with the second frequency band from the network node, the UL grant being based at least in part on the first RS in the first frequency band. The cross frequency/band SRS indication component 198 may be within the cellular baseband processor 1224, the application processor 1206, or both the cellular baseband processor 1224 and the application processor 1206. The cross frequency/band SRS indication component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for transmitting an indication of a UE capability to a network node, the indication of the UE capability including an association between a first RS transmitted in a first frequency band and a second frequency band, the second frequency band being different from the first frequency band, means for transmitting the first RS in the first frequency band to the network node, and means for receiving an UL grant scheduling a UL channel associated with the second frequency band from the network node, the UL grant being based at least in part on the first RS in the first frequency band. The apparatus 1204 includes means for transmitting a second RS resource set in the second frequency band, the second RS resource set being transmitted with a lower periodicity than the first RS resource set, and means for reporting a first subset of RS resources in the first RS resource set associated with a second subset of RS resources in the second RS resource set, the first subset of RS resources simulating the second subset of RS resources. The apparatus 1204 includes means for receiving a RRC configuration for the first RS resource set of the first serving cell and the second RS resource set of the second serving cell, means for receiving an order to transmit the indication of the UE capability to the network node, the indication of the UE capability to the network node being transmitted based on the order to transmit the indication of the UE capability, means for receiving a RRC configuration of the first RS resource set of the first serving cell, the first RS resource set being associated with the UL grant of the second serving cell, means for reporting a first subset of RS resources among the first RS resource set associated with a PUSCH, and means for receiving an order to transmit the indication of the UE capability to the network node, the indication of the UE capability is transmitted based on the order to transmit the indication of the UE capability. The apparatus 1204 includes means for predicting a UL precoding for a PUSCH within the second serving cell based on the at least one of the SRI or the TPMI associated with the first RS resource set. The means may be the cross frequency/band SRS indication component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
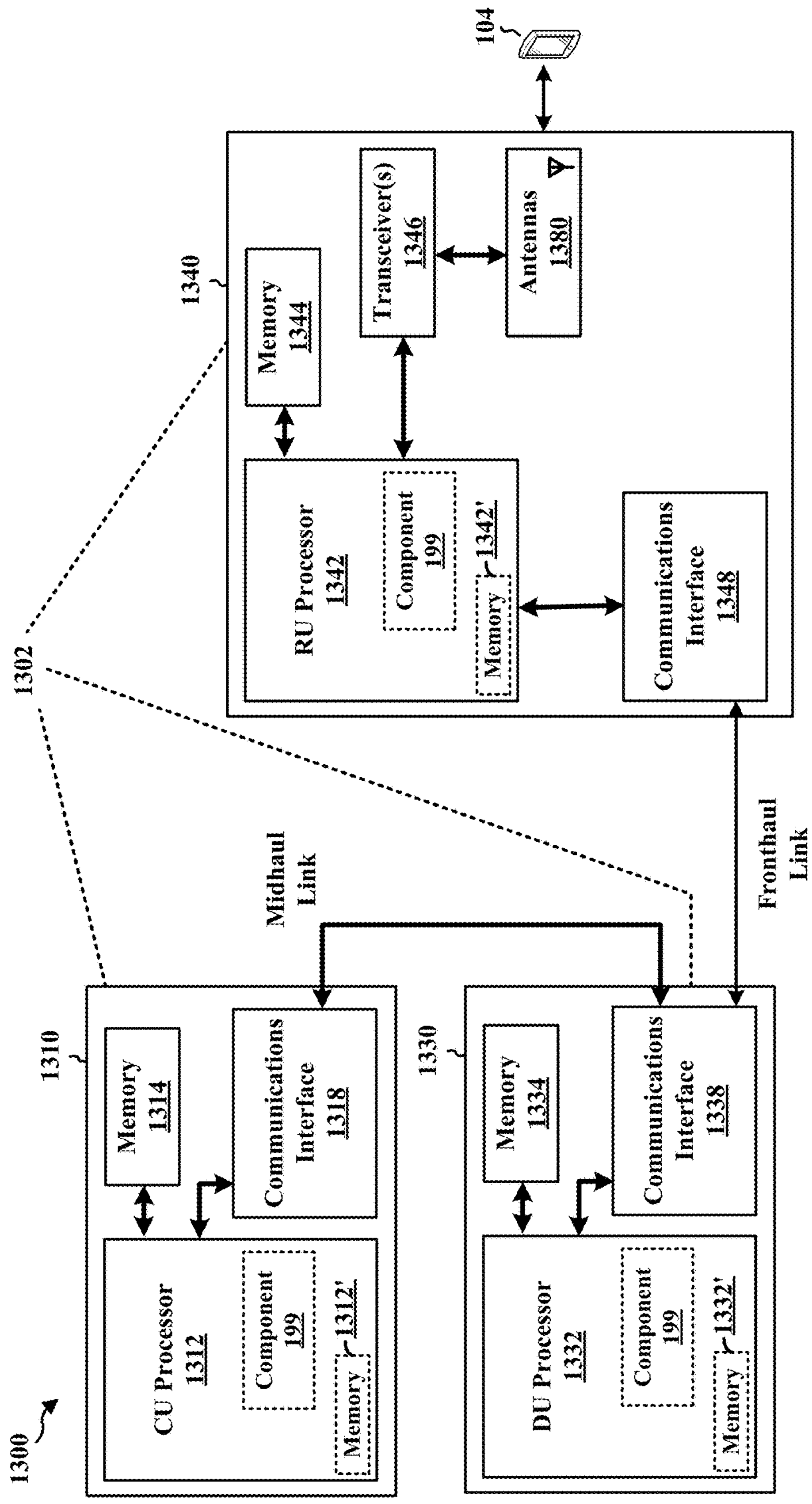
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the cross frequency/band SRS indication component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the cross frequency/band SRS indication component 199 is configured to receive an indication of a UE capability from a UE, the indication of the UE capability including an association between a first RS received in a first frequency band and a second frequency band, the second frequency band being different from the first frequency band, receive the first RS in the first frequency band from the UE, and transmit a UL grant scheduling a UL channel associated with the second frequency band for the UE, the UL grant being based at least in part on the first RS in the first frequency band. The cross frequency/band SRS indication component 199 may be within one or more processors of one or more of the CU 1310, DU 1330, and the RU 1340. The cross frequency/band SRS indication component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 includes means for receiving an indication of a UE capability from a UE, the indication of the UE capability including an association between a first RS received in a first frequency band and a second frequency band, the second frequency band being different from the first frequency band, means for receiving the first RS in the first frequency band from the UE, and means for transmitting an UL grant scheduling a UL channel associated with the second frequency band for the UE, the UL grant being based at least in part on the first RS in the first frequency band. The network entity 1302 includes means for receiving a second RS resource set in the second frequency band, the second RS resource set being transmitted with a lower periodicity than the first RS resource set, and means for predicting the UL grant based at least in part on the first RS resource set and the second RS resource set. The network entity 1302 includes means for receiving a report of a first subset of RS resources in the first RS resource set associated with a second subset of RS resources in the second RS resource set, the first subset of RS resources simulating the second subset of RS resources, means for transmitting a RRC configuration for the first RS resource set and the second RS resource set, and means for transmitting an order for the UE to transmit the indication of the UE capability to the network node, the indication of the UE capability being received based on the order to transmit the indication of the UE capability, and means for transmitting an order for the UE to transmit the indication of the UE capability to the network node, and the indication of the UE capability is received based on the order to transmit the indication of the UE capability. The network entity 1302 includes means for receiving a PUSCH within the second serving cell with a UL precoding associated with the UL grant based on the at least one of the SRI or the TPMI associated with the first RS resource set, or means for receiving a report of a first subset of RS resources among the first RS resource set associated with a PUSCH and means for configuring a MCS of the PUSCH based on the report of the first subset of RS resources, or means for transmitting a RRC configuration of the first RS resource set of the first serving cell, the first RS resource set being associated with the UL grant of the second serving cell. The means may be the cross frequency/band SRS indication component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

Figure 14:
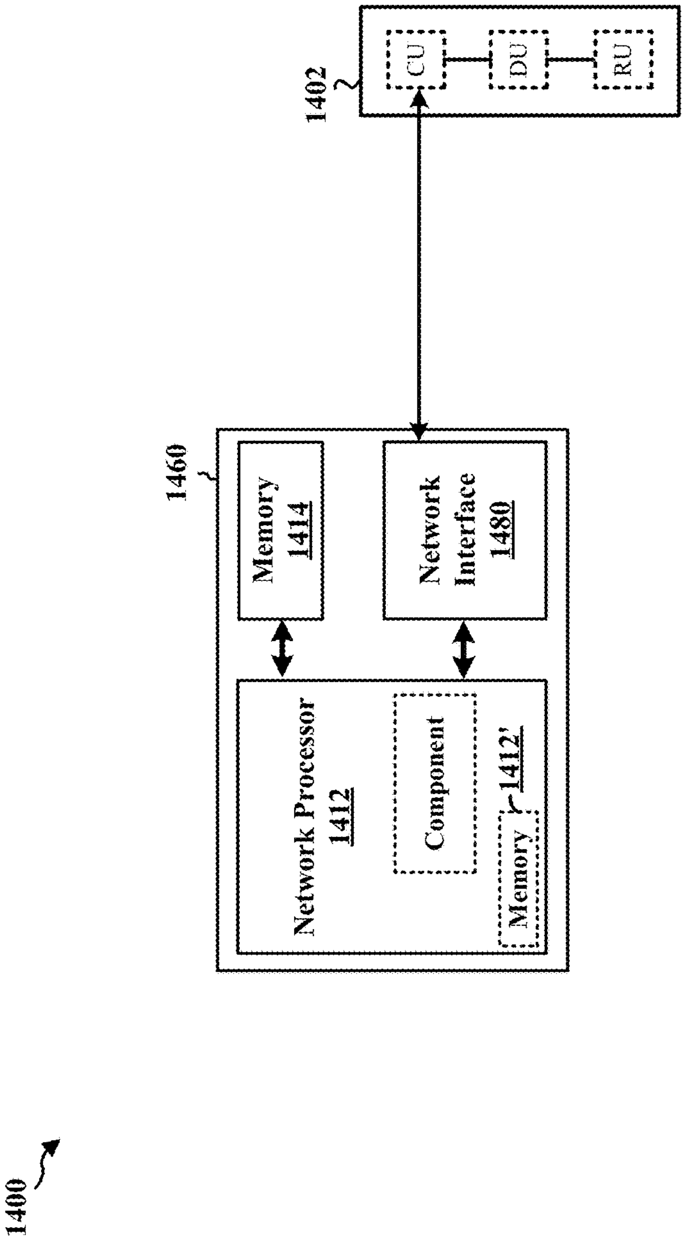
FIG. 14 is a diagram illustrating an example of a hardware implementation for an example network entity.

FIG. 14 is a diagram 1400 illustrating an example of a hardware implementation for a network entity 1460. In one example, the network entity 1460 may be within the core network 120. The network entity 1460 may include a network processor 1412. The network processor 1412 may include on-chip memory 1412'. In some aspects, the network entity 1460 may further include additional memory modules 1414. The network entity 1460 communicates via the network interface 1480 directly (e.g., backhaul link) or indirectly (e.g., through a RIC) with the CU 1402. The on-chip memory 1412' and the additional memory modules 1414 may each be considered a computer-readable medium/memory. Each computer-readable medium/memory may be non-transitory. The processor 1412 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the cross frequency/band SRS indication component 199 is configured to receive an indication of a UE capability from a UE, the indication of the UE capability including an association between a first RS received in a first frequency band and a second frequency band, the second frequency band being different from the first frequency band, receive the first RS in the first frequency band from the UE, and transmit a UL grant scheduling a UL channel associated with the second frequency band for the UE, the UL grant being based at least in part on the first RS in the first frequency band. The cross frequency/band SRS indication component 199 may be within the processor 1412. The cross frequency/band SRS indication component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1460 may include a variety of components configured for various functions. In one configuration, the network entity 1460 includes means for receiving an indication of a UE capability from a UE, the indication of the UE capability including an association between a first RS received in a first frequency band and a second frequency band, means for receiving the first RS resource set in the first frequency band from the UE, and means for transmitting an UL grant scheduling a UL channel associated with the second frequency band for the UE, the UL grant being based at least in part on the first RS resource set in the first frequency band. The network entity 1302 includes means for receiving a second RS resource set in the second frequency band, the second RS resource set being transmitted with a lower periodicity than the first RS resource set, and means for predicting the UL grant based at least in part on the first RS resource set and the second RS resource set. The network entity 1302 includes means for receiving a report of a first subset of RS resources in the first RS resource set associated with a second subset of RS resources in the second RS resource set, the first subset of RS resources simulating the second subset of RS resources, means for transmitting a RRC configuration for the first RS resource set and the second RS resource set, and means for transmitting an order for the UE to transmit the indication of the UE capability to the network node, the indication of the UE capability being received based on the order to transmit the indication of the UE capability, and means for transmitting an order for the UE to transmit the indication of the UE capability to the network node, and the indication of the UE capability is received based on the order to transmit the indication of the UE capability. The network entity 1302 includes means for receiving a PUSCH within the second serving cell with a UL precoding associated with the UL grant based on the at least one of the SRI or the TPMI associated with the first RS resource set, or means for receiving a report of a first subset of RS resources among the first RS resource set associated with a PUSCH and means for configuring a MCS of the PUSCH based on the report of the first subset of RS resources, or means for transmitting a RRC configuration of the first RS resource set of the first serving cell, the first RS resource set being associated with the UL grant of the second serving cell. The means may be the cross frequency/band SRS indication component 199 of the network entity 1460 configured to perform the functions recited by the means.

The apparatus may include a UE and a network node. The UE may be configured to transmit an indication of UE capability to support a cross frequency range/band SRS indication for PUSCH scheduling. The UE may transmit the indication of the UE capability to the network node, the indication of the UE capability including an association between a first RS resource set in a first frequency band and a second frequency band, transmit the first RS resource set in the first frequency band to the network node; and receive a UL grant scheduling a UL channel associated with the second frequency band from the network node, the UL grant being based at least in part on the first RS resource set in the first frequency band. The network node may receive the indication of the UE capability, receive the first RS resource set in the first frequency band from the UE, and transmit the UL grant scheduling the UL channel associated with the second frequency band for the UE, the UL grant being based at least in part on the first RS resource set in the first frequency band. The indication of the UE capability may include information associated with a first set of antenna elements of the UE and a second set of antenna elements of the UE, where the first set of antenna elements is associated with the first frequency band and the second set of antenna elements is associated with the second frequency band.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including transmitting an indication of a UE capability to a network node, the indication of the UE capability including an association between a first RS transmitted in a first frequency band and a second frequency band, the second frequency band being different from the first frequency band, transmitting the first RS in the first frequency band to the network node, and receiving a UL grant scheduling a UL channel associated with the second frequency band from the network node, the UL grant being based at least in part on the first RS in the first frequency band.

Aspect 2 is the method of aspect 1, where the second frequency band is a higher frequency band than the first frequency band, and the UL channel is a PUSCH.

Aspect 3 is the method of any of aspects 1 and 2, where the UE includes a first set of antenna elements associated with the first frequency band and a second set of antenna elements associated with the second frequency band, the second set of antenna elements being different from the first set of antenna elements, and where the indication of the UE capability includes information associated with the first set of antenna elements and the second set of antenna elements.

Aspect 4 is the method of aspect 3, where the second set of antenna elements is located in a second antenna panel, the second antenna panel being associated with a frequency range different from the first set of antenna elements, and where the information includes at least one of a distance between the first set of antenna elements and the second antenna panel, one or more directionalities of the first set of antenna elements and the second antenna panel, or a second association between a first TX beamforming angle spread of the first set of antenna elements and a second TX beamforming angle spread of the second antenna panel.

Aspect 5 is the method of any of aspects 3 and 4, where the first set of antenna elements and the second set of antenna elements are located on an antenna panel, and the information includes at least one of a first number of the first set of antenna elements and a second number of the second set of antenna elements on the antenna panel, a pattern of the first set of antenna elements and the second set of antenna elements on the antenna panel, or a coupling loss difference between the first set of antenna elements and the second set of antenna elements.

Aspect 6 is the method of any of aspects 1 to 5, where the first frequency band including a first RS resource set carrying the first RS is associated with a first serving cell and the second frequency band is associated with a second serving cell, the method further includes transmitting a second RS resource set in the second frequency band, the second RS resource set being transmitted with a lower periodicity than the first RS resource set, and where the indication of the UE capability includes a capability of the UE to receive the UL grant based at least in part on the first RS resource set and the second RS resource set.

Aspect 7 is the method of aspect 6, where the UL grant includes at least one of a SRI or a TPMI associated with the second RS resource set.

Aspect 8 is the method of aspect 6 and 7, further including reporting a first subset of RS resources in the first RS resource set associated with a second subset of RS resources in the second RS resource set, the first subset of RS resources simulating the second subset of RS resources.

Aspect 9 is the method of aspect 8, where the first subset of RS resources includes a complete set of the first RS resource set.

Aspect 10 is the method of any of aspects 6 to 9, further including receiving a RRC configuration for the first RS resource set of the first serving cell and the second RS resource set of the second serving cell.

Aspect 11 is the method of aspect 10, further including receiving an order to transmit the indication of the UE capability to the network node, the indication of the UE capability to the network node being transmitted based on the order to transmit the indication of the UE capability.

Aspect 12 is the method of aspect 11, where the order to transmit the indication of the UE capability is received via at least one of an RRC message, a first MAC-CE, or DCI, and the first subset of RS resources is reported via at least one an RRC response, a second MAC-CE, or UCI.

Aspect 13 is the method of any of aspects 10 to 12, where the RRC configuration includes a dedicated RS configuration for the second RS resource set associated with the second serving cell linked with the first serving cell, and where the indication of the UE capability is transmitted based on the RRC configuration including the dedicated RS configuration for the second RS resource set.

Aspect 14 is the method of any of aspects 1 to 13, where the first frequency band including a first RS resource set carrying the first RS is associated with a first serving cell, and wherein the indication of the UE capability includes a capability of the UE to receive the UL grant within a second serving cell associated with the second frequency band.

Aspect 15 is the method of aspect 14, where the UL grant includes at least one of a SRI or a TPMI associated with the first RS resource set, and the method further includes predicting a UL precoding for a PUSCH within the second serving cell based on the at least one of the SRI or the TPMI associated with the first RS resource set.

Aspect 16 is the method of any of aspects 14 and 15, further including reporting a first subset of RS resources among the first RS resource set associated with a PUSCH.

Aspect 17 is the method of aspect 16, where a MCS of the PUSCH is based on the report of the first subset of RS resources.

Aspect 18 is the method of any of aspects 14 to 17, further including receiving a RRC configuration of the first RS resource set of the first serving cell, the first RS resource set being associated with the UL grant of the second serving cell.

Aspect 19 is the method of aspect 18, further including receiving an order to transmit the indication of the UE capability to the network node, and the indication of the UE capability is transmitted based on the order to transmit the indication of the UE capability.

Aspect 20 is the method of aspect 19, where the order to transmit the indication of the UE capability is received via at least one of an RRC message, a first MAC-CE, or DCI, and the first subset of RS resources is reported via at least one an RRC response, a second MAC-CE, or UCI.

Aspect 21 is the method of any of aspects 18 to 20, where the indication of the UE capability to the network node is transmitted based on receiving the RRC configuration of the first RS resource set of the first serving cell.

Aspect 22 is an apparatus for wireless communication including at least one processor coupled to a memory and configured to implement any of aspects 1 to 21, further including a transceiver coupled to the at least one processor.

Aspect 23 is an apparatus for wireless communication including means for implementing any of aspects 1 to 21.

Aspect 24 is a non-transitory computer-readable medium storing computer executable code, where the code when executed by a processor causes the processor to implement any of aspects 1 to 21.

Aspect 25 is a method of wireless communication at a network node, including receiving an indication of a UE capability from a UE, the indication of the UE capability including an association between a first RS received in a first frequency band and a second frequency band, the second frequency band being different from the first frequency band, receiving the first RS in the first frequency band from the UE, and transmitting a UL grant scheduling a UL channel associated with the second frequency band for the UE, the UL grant being based at least in part on the first RS in the first frequency band.

Aspect 26 is the method of aspect 25, where the second frequency band is a higher frequency band than the first frequency band, and the UL channel is a PUSCH.

Aspect 27 is the method of any of aspects 25 and 26, where the indication of the UE capability includes information associated with a first set of antenna elements of the UE and a second set of antenna elements of the UE, where the first set of antenna elements is associated with the first frequency band and the second set of antenna elements is associated with the second frequency band.

Aspect 28 is the method of aspect 27, where the second set of antenna elements is located in a second antenna panel of the UE, and where the information includes at least one of a distance between the first set of antenna elements and the second antenna panel, one or more directionalities of the first set of antenna elements and the second antenna panel, or a second association between a first TX beamforming angle spread of the first set of antenna elements and a second TX beamforming angle spread of the second antenna panel.

Aspect 29 is the method of any of aspects 27 and 28, where the first set of antenna elements and the second set of antenna elements are located on an antenna panel, and where the information includes at least one of a first number of the first set of antenna elements and a second number of the second set of antenna elements on the antenna panel, a pattern of the first set of antenna elements and the second set of antenna elements on the antenna panel, or a coupling loss difference between the first set of antenna elements and the second set of antenna elements.

Aspect 30 is the method of any of aspects 25 to 29, where the first frequency band including a first RS resource set carrying the first RS is associated with a first serving cell and the second frequency band is associated with a second serving cell, the indication of the UE capability includes a capability of the UE to receive the UL grant based at least in part on the first RS resource set and the second RS resource set, and based on the indication of the capability of the UE, the method further includes receiving a second RS resource set in the second frequency band, the second RS resource set being transmitted with a lower periodicity than the first RS resource set, and predicting the UL grant based at least in part on the first RS resource set and the second RS resource set.

Aspect 31 is the method of aspect 30, where the UL grant includes at least one of a SRI or a TPMI associated with the second RS resource set.

Aspect 32 is the method of aspect 30 and 31, further including receiving a report of a first subset of RS resources in the first RS resource set associated with a second subset of RS resources in the second RS resource set, the first subset of RS resources simulating the second subset of RS resources.

Aspect 33 is the method of aspect 32, where the first subset of RS resources includes a complete set of the first RS resource set.

Aspect 34 is the method of any of aspects 30 to 33, further including transmitting a RRC configuration for the first RS resource set and the second RS resource set, the first RS resource set being associated with a first serving cell and the second RS resource set being associated with a second serving cell.

Aspect 35 is the method of aspect 34, further including transmitting an order for the UE to transmit the indication of the UE capability to the network node, the indication of the UE capability being received based on the order to transmit the indication of the UE capability.

Aspect 36 is the method of aspect 35, where the order to transmit the indication of the UE capability is transmitted via at least one of an RRC message, a first MAC-CE, or DCI, and the report of the first subset of RS resources is received via at least one an RRC response, a second MAC-CE, or UCI.

Aspect 37 is the method of any of aspects 34 to 36, where the RRC configuration includes a dedicated RS configuration for the second RS resource set associated with the second serving cell linked with the first serving cell, and where the indication of the UE capability is transmitted based on the RRC configuration including the dedicated RS configuration for the second RS resource set.

Aspect 38 is the method of any of aspects 25 to 37, where the first frequency band including a first RS resource set carrying the first RS is associated with a first serving cell, and wherein the indication of the UE capability includes a capability of the UE to receive the UL grant within a second serving cell associated with the second frequency band.

Aspect 39 is the method of aspect 38, where the UL grant includes at least one of a SRI or a TPMI associated with the first RS resource set, and the method further includes receiving a PUSCH within the second serving cell with a UL precoding associated with the UL grant based on the at least one of the SRI or the TPMI associated with the first RS resource set.

Aspect 40 is the method of any of aspects 38 and 39, further including receiving a report of a first subset of RS resources among the first RS resource set associated with a PUSCH.

Aspect 41 is the method of aspect 40, further including configuring a MCS of the PUSCH based on the report of the first subset of RS resources.

Aspect 42 is the method of any of aspects 38 to 41, further including transmitting a RRC configuration of the first RS resource set of the first serving cell, the first RS resource set being associated with the UL grant of the second serving cell.

Aspect 43 is the method of aspect 42, further including transmitting an order for the UE to transmit the indication of the UE capability to the network node, and the indication of the UE capability is received based on the order to transmit the indication of the UE capability.

Aspect 44 is the method of aspect 43, where the order to transmit the indication of the UE capability is transmitted via at least one of an RRC message, a first MAC-CE, or DCI, and the report of the first subset of RS resources is received via at least one an RRC response, a second MAC-CE, or UCI.

Aspect 45 is the method of any of aspects 42 to 44, where the indication of the UE capability to the network node is received based on transmitting the RRC configuration of the first RS resource set of the first serving cell.

Aspect 46 is an apparatus for wireless communication including at least one processor coupled to a memory and configured to implement any of aspects 25 to 45, further including a transceiver coupled to the at least one processor.

Aspect 47 is an apparatus for wireless communication including means for implementing any of aspects 25 to 45.

Aspect 48 is a non-transitory computer-readable medium storing computer executable code, where the code when executed by a processor causes the processor to implement any of aspects 25 to 45.

What is claimed is:

1. An apparatus for wireless communication at a user equipment (UE), comprising:

a memory; and at least one processor coupled to the memory and configured to:

transmit an indication of a UE capability to a network node, the indication of the UE capability including an association between a first reference signal (RS) transmitted in a first frequency band and a second frequency band, the second frequency band being different from the first frequency band;

transmit the first RS in the first frequency band to the network node; and receive an uplink (UL) grant scheduling a UL channel associated with the second frequency band from the network node, the UL grant being based at least in part on the first RS in the first frequency band.

2. The apparatus of claim 1, further comprising a transceiver coupled to the at least one processor, and wherein the second frequency band is a higher frequency band than the first frequency band, and the UL channel is a physical uplink shared channel (PUSCH).

3. The apparatus of claim 1, wherein the UE includes a first set of antenna elements associated with the first frequency band and a second set of antenna elements associated with the second frequency band, the second set of antenna elements being different from the first set of antenna elements, and wherein the indication of the UE capability includes information associated with the first set of antenna elements and the second set of antenna elements.

4. The apparatus of claim 3, wherein the second set of antenna elements is located in a second antenna panel, the second antenna panel being associated with a frequency range different from the first set of antenna elements, and wherein the information includes at least one of:

a distance between the first set of antenna elements and the second antenna panel, one or more directionalities of the first set of antenna elements and the second antenna panel, or a second association between a first transmit (TX) beamforming angle spread of the first set of antenna elements and a second TX beamforming angle spread of the second antenna panel.

5. The apparatus of claim 3, wherein the first set of antenna elements and the second set of antenna elements are located on an antenna panel, and wherein the information includes at least one of:

a first number of the first set of antenna elements and a second number of the second set of antenna elements on the antenna panel, a pattern of the first set of antenna elements and the second set of antenna elements on the antenna panel, or a coupling loss difference between the first set of antenna elements and the second set of antenna elements.

6. The apparatus of claim 1, wherein the first frequency band including a first RS resource set carrying the first RS is associated with a first serving cell and the second frequency band is associated with a second serving cell, wherein the at least one processor is further configured to transmit a second RS resource set in the second frequency band, the second RS resource set being transmitted with a lower periodicity than the first RS resource set, and wherein the indication of the UE capability includes a capability of the UE to receive the UL grant based at least in part on the first RS resource set and the second RS resource set.

7. The apparatus of claim 6, wherein the UL grant includes at least one of a sounding RS resource indicator (SRI) or a transmit precoder matrix indicator (TPMI) associated with the second RS resource set.

8. The apparatus of claim 6, wherein the at least one processor is further configured to report a first subset of RS resources in the first RS resource set associated with a second subset of RS resources in the second RS resource set, the first subset of RS resources simulating the second subset of RS resources.

9. The apparatus of claim 8, wherein the first subset of RS resources includes a complete set of the first RS resource set.

10. The apparatus of claim 6, wherein the at least one processor is further configured to receive a radio resource control (RRC) configuration for the first RS resource set of the first serving cell and the second RS resource set of the second serving cell.

11. The apparatus of claim 10, wherein the at least one processor is further configured to receive an order to transmit the indication of the UE capability to the network node, the indication of the UE capability to the network node being transmitted based on the order to transmit the indication of the UE capability.

12. The apparatus of claim 10, wherein the RRC configuration includes a dedicated RS configuration for the second RS resource set associated with the second serving cell linked with the first serving cell, and wherein the indication of the UE capability is transmitted based on the RRC configuration including the dedicated RS configuration for the second RS resource set.

13. The apparatus of claim 1, wherein the first frequency band including a first RS resource set carrying the first RS is associated with a first serving cell, and wherein the indication of the UE capability includes a capability of the UE to receive the UL grant within a second serving cell associated with the second frequency band.

14. The apparatus of claim 13, wherein the UL grant includes at least one of a sounding RS resource indicator (SRI) or a transmit precoder matrix indicator (TPMI) associated with the first RS resource set, and wherein the at least one processor is further configured to predict a UL precoding for a physical uplink shared channel (PUSCH) within the second serving cell based on the at least one of the SRI or the TPMI associated with the first RS resource set.

15. The apparatus of claim 13, wherein the at least one processor is further configured to report a first subset of RS resources among the first RS resource set associated with a physical uplink shared channel (PUSCH).

16. The apparatus of claim 13, wherein the at least one processor is further configured to receive a radio resource control (RRC) configuration of the first RS resource set of the first serving cell, the first RS resource set being associated with the UL grant of the second serving cell.

17. The apparatus of claim 16, wherein the at least one processor is further configured to receive an order to transmit the indication of the UE capability to the network node, and the indication of the UE capability is transmitted based on the order to transmit the indication of the UE capability.

18. The apparatus of claim 16, wherein the indication of the UE capability to the network node is transmitted based on receiving the RRC configuration of the first RS resource set of the first serving cell.

19. A method of wireless communication at a user equipment (UE), comprising:

transmitting an indication of a UE capability to a network node, the indication of the UE capability including an association between a first reference signal (RS) transmitted in a first frequency band and a second frequency band, the second frequency band being different from the first frequency band;

transmitting the first RS in the first frequency band to the network node; and receiving an uplink (UL) grant scheduling a UL channel associated with the second frequency band from the network node, the UL grant being based at least in part on the first RS in the first frequency band.

20. An apparatus for wireless communication at a network node, comprising:

a memory; and at least one processor coupled to the memory and configured to:

receive an indication of a user equipment (UE) capability from a UE, the indication of the UE capability including an association between a first reference signal (RS) received in a first frequency band and a second frequency band, the second frequency band being different from the first frequency band;

receive the first RS in the first frequency band from the UE; and transmit an uplink (UL) grant scheduling a UL channel associated with the second frequency band for the UE, the UL grant being based at least in part on the first RS in the first frequency band.

21. The apparatus of claim 20, wherein the first frequency band including a first RS resource set carrying the first RS is associated with a first serving cell and the second frequency band is associated with a second serving cell, wherein the indication of the UE capability includes a capability of the UE to receive the UL grant based at least in part on the first RS resource set and a second RS resource set, and wherein, based on the indication of the capability of the UE, the at least one processor is further configured to:

receive a second RS resource set in the second frequency band, the second RS resource set being transmitted with a lower periodicity than the first RS resource set; and predict the UL grant based at least in part on the first RS resource set and the second RS resource set.

22. The apparatus of claim 21, wherein the at least one processor is further configured to receive a report of a first subset of RS resources in the first RS resource set associated with a second subset of RS resources in the second RS resource set, the first subset of RS resources simulating the second subset of RS resources.

23. The apparatus of claim 22, wherein the at least one processor is further configured to transmit a radio resource control (RRC) configuration for the first RS resource set and the second RS resource set, the first RS resource set being associated with the first serving cell and the second RS resource set being associated with the second serving cell.

24. The apparatus of claim 23, wherein the at least one processor is further configured to transmit an order to for the UE to transmit the indication of the UE capability to the network node, the indication of the UE capability to the network node being received based on the order to transmit the indication of the UE capability.

25. The apparatus of claim 20, wherein the first frequency band including a first RS resource set carrying the first RS is associated with a first serving cell, and wherein the indication of the UE capability indicates a capability of the UE to receive the UL grant within a second serving cell associated with the second frequency band, wherein the UL grant includes at least one of a sounding RS resource indicator (SRI) or a transmit precoder matrix indicator (TPMI) associated with the first RS resource set, and wherein the at least one processor is further configured to receive a physical uplink shared channel (PUSCH) within the second serving cell with a UL precoding associated with the UL grant based on the at least one of the SRI or the TPMI associated with the first RS resource set.

26. The apparatus of claim 25, wherein the at least one processor is further configured to receive a report of a first subset of RS resources among the first RS resource set associated with the PUSCH.

27. The apparatus of claim 26, wherein the at least one processor is further configured to configure a modulation and coding scheme (MCS) of the PUSCH based on the report of the first subset of RS resources.

28. The apparatus of claim 26, wherein the at least one processor is further configured to transmit a radio resource control (RRC) configuration of the first RS resource set of the first serving cell, the first RS resource set being associated with the UL grant of the second serving cell.

29. The apparatus of claim 28, wherein the at least one processor is further configured to transmit an order for the UE to transmit the indication of the UE capability to the network node, and the indication of the UE capability is received based on the order to transmit the indication of the UE capability.

30. A method of wireless communication at a network node, comprising:

receiving an indication of a user equipment (UE) capability from a UE, the indication of the UE capability including an association between a first reference signal (RS) received in a first frequency band and a second frequency band, the second frequency band being different from the first frequency band;

receiving the first RS in the first frequency band from the UE; and transmitting an uplink (UL) grant scheduling a UL channel associated with the second frequency band for the UE, the UL grant being based at least in part on the first RS in the first frequency band.

* * * * *